N. E. FUNK.
ENVELOP MACHINE.
APPLICATION FILED NOV. 4, 1913.
1,225,026.
Patented May 8, 1917.
29 SHEETS—SHEET 22.
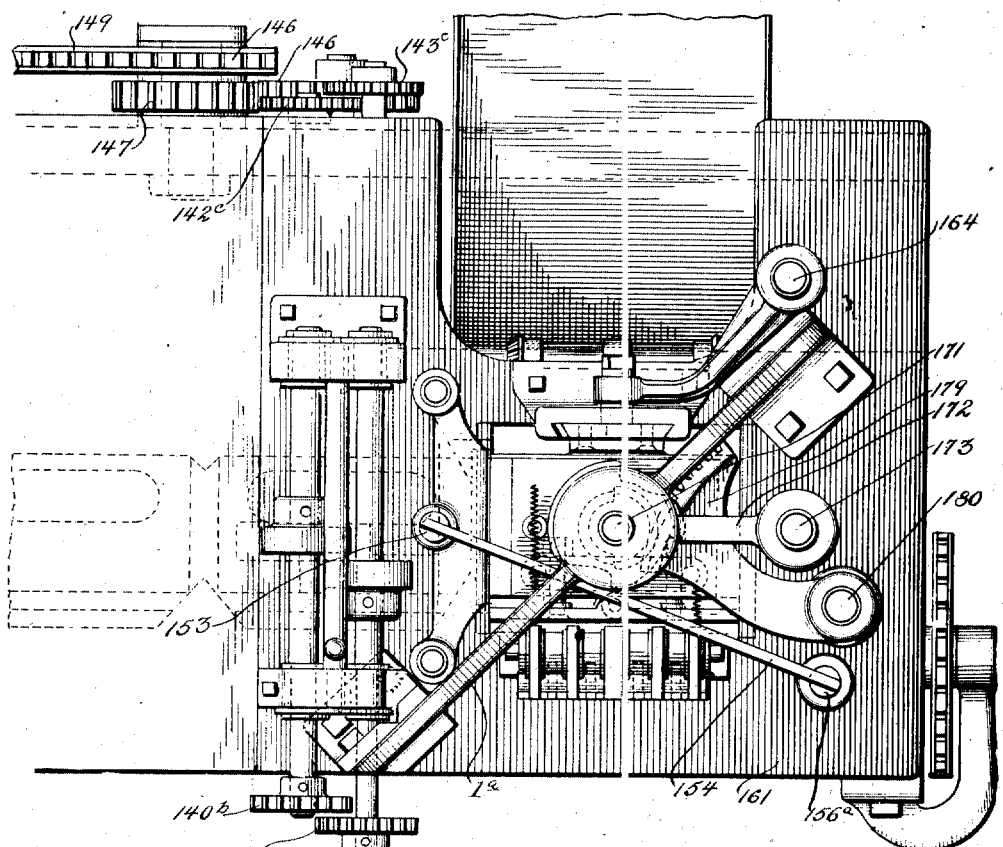
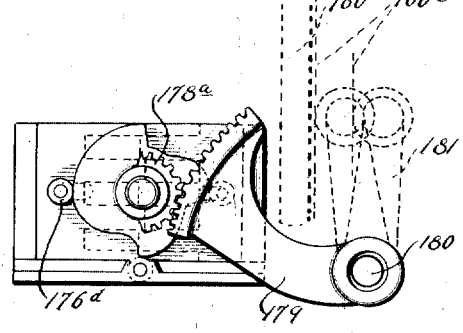
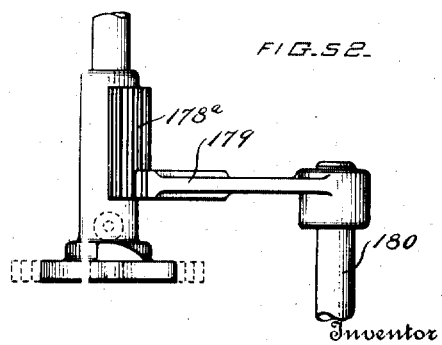

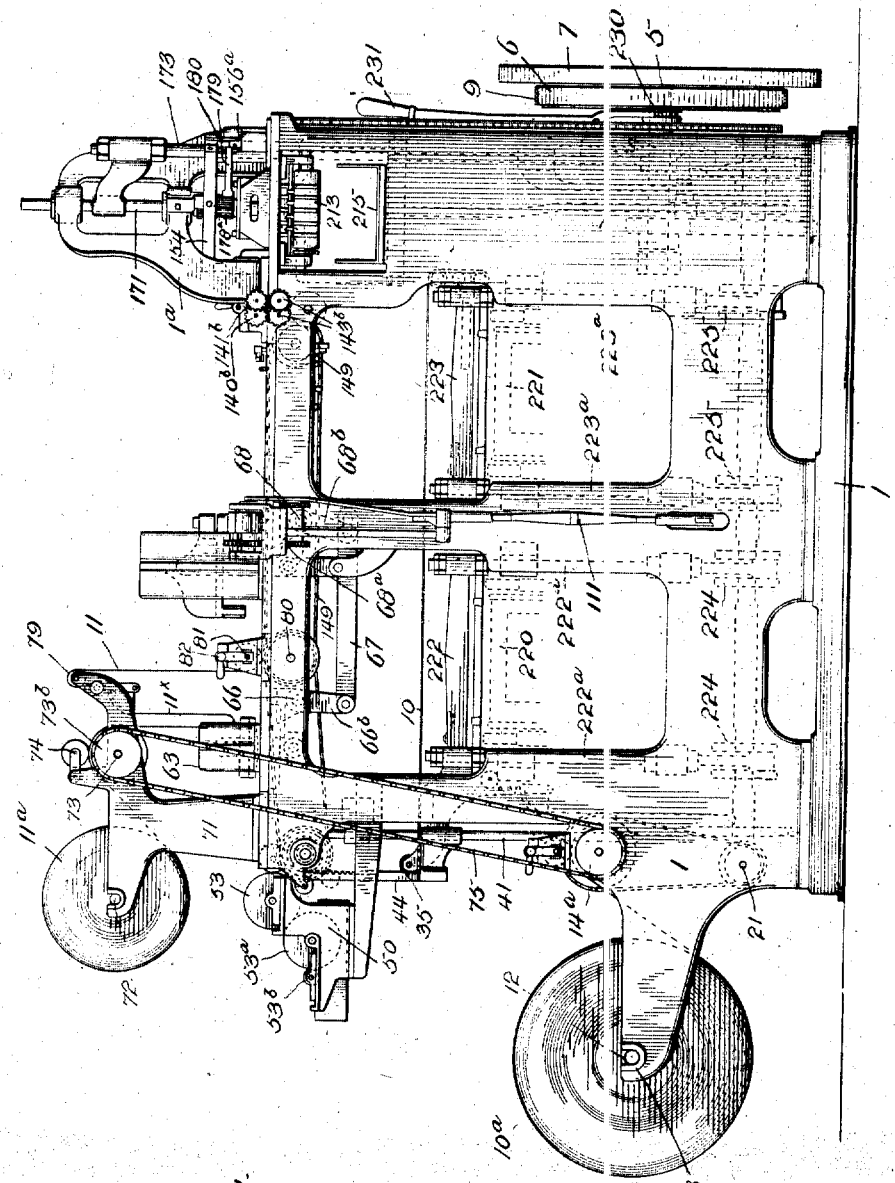

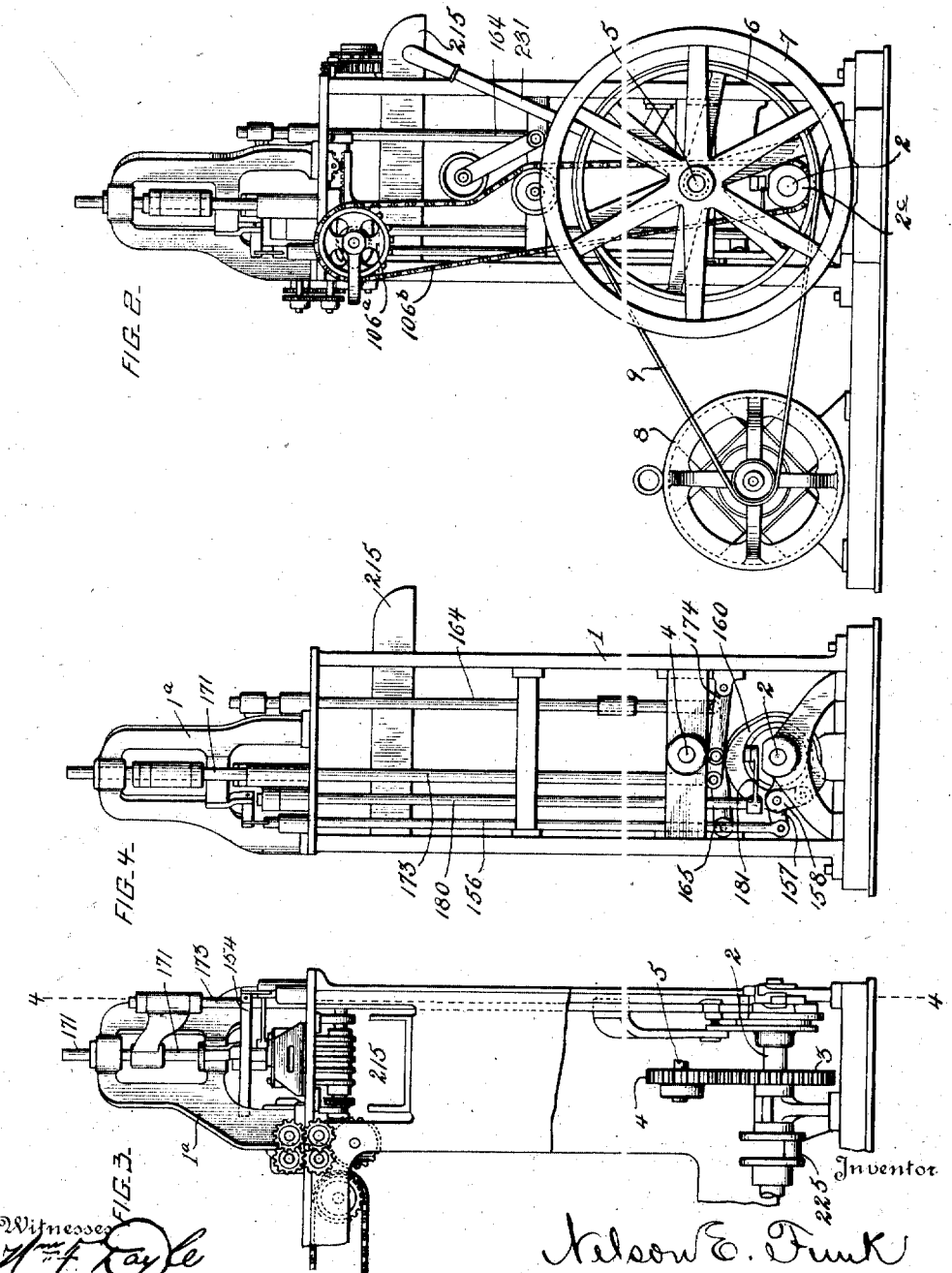

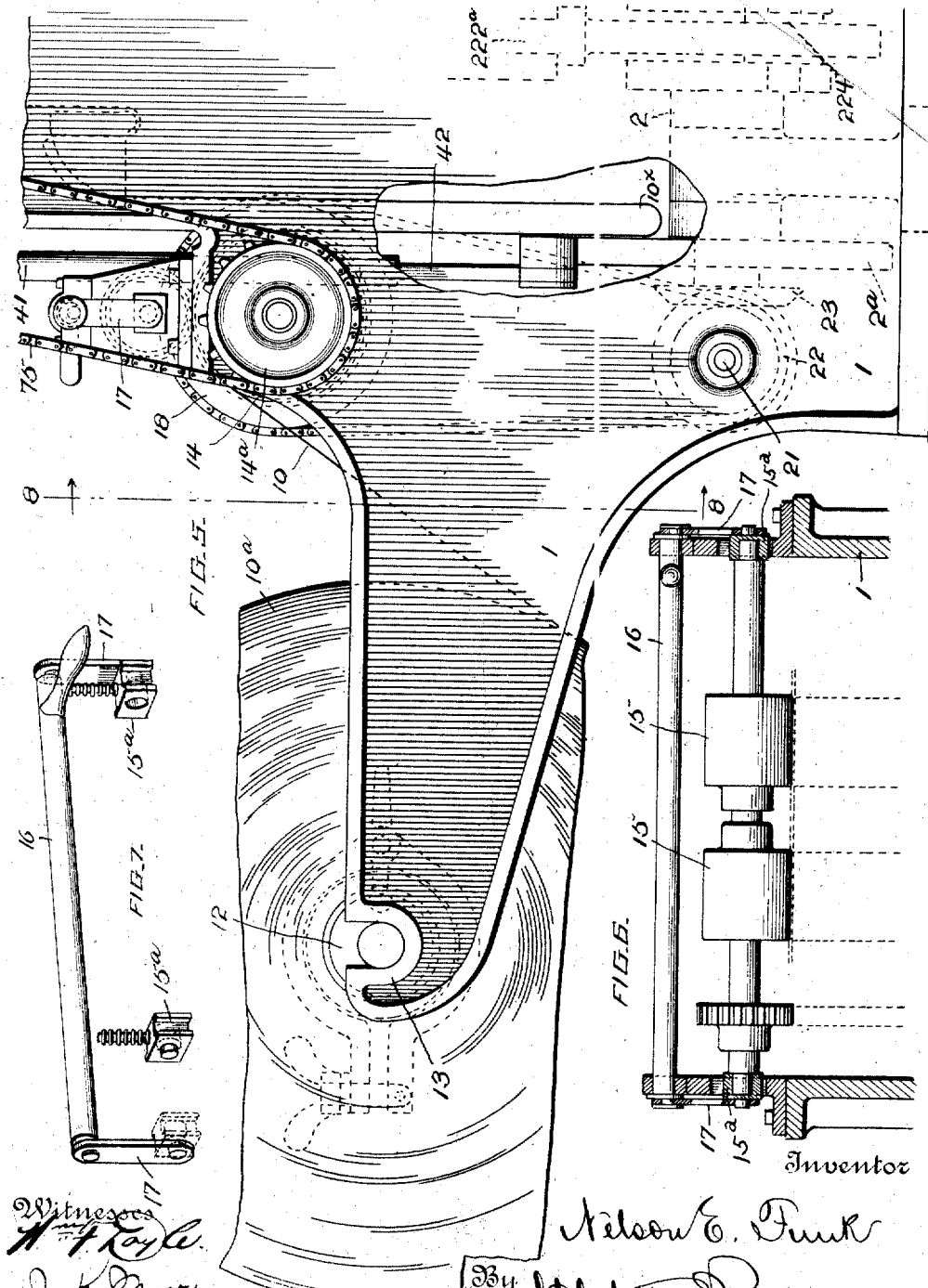

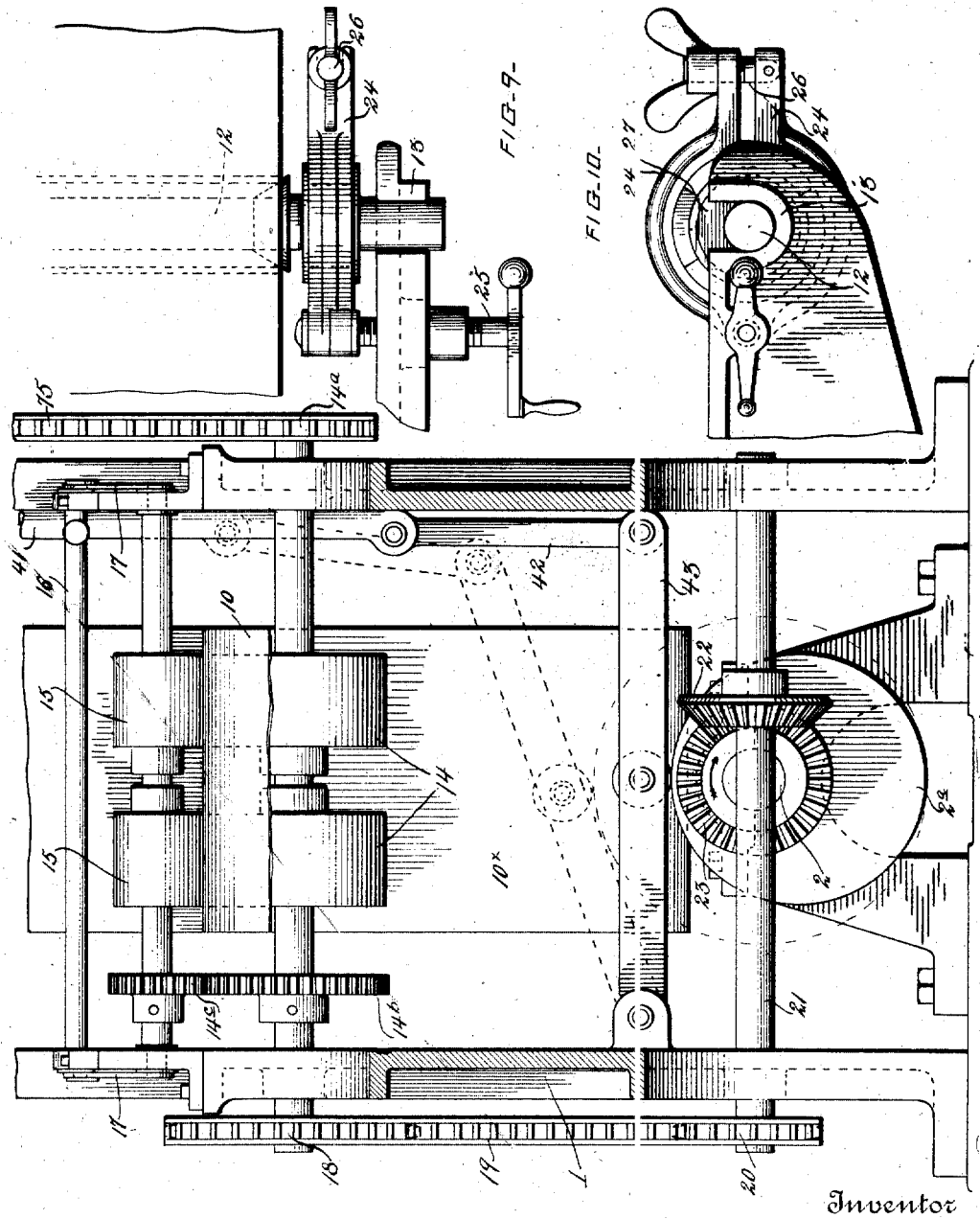

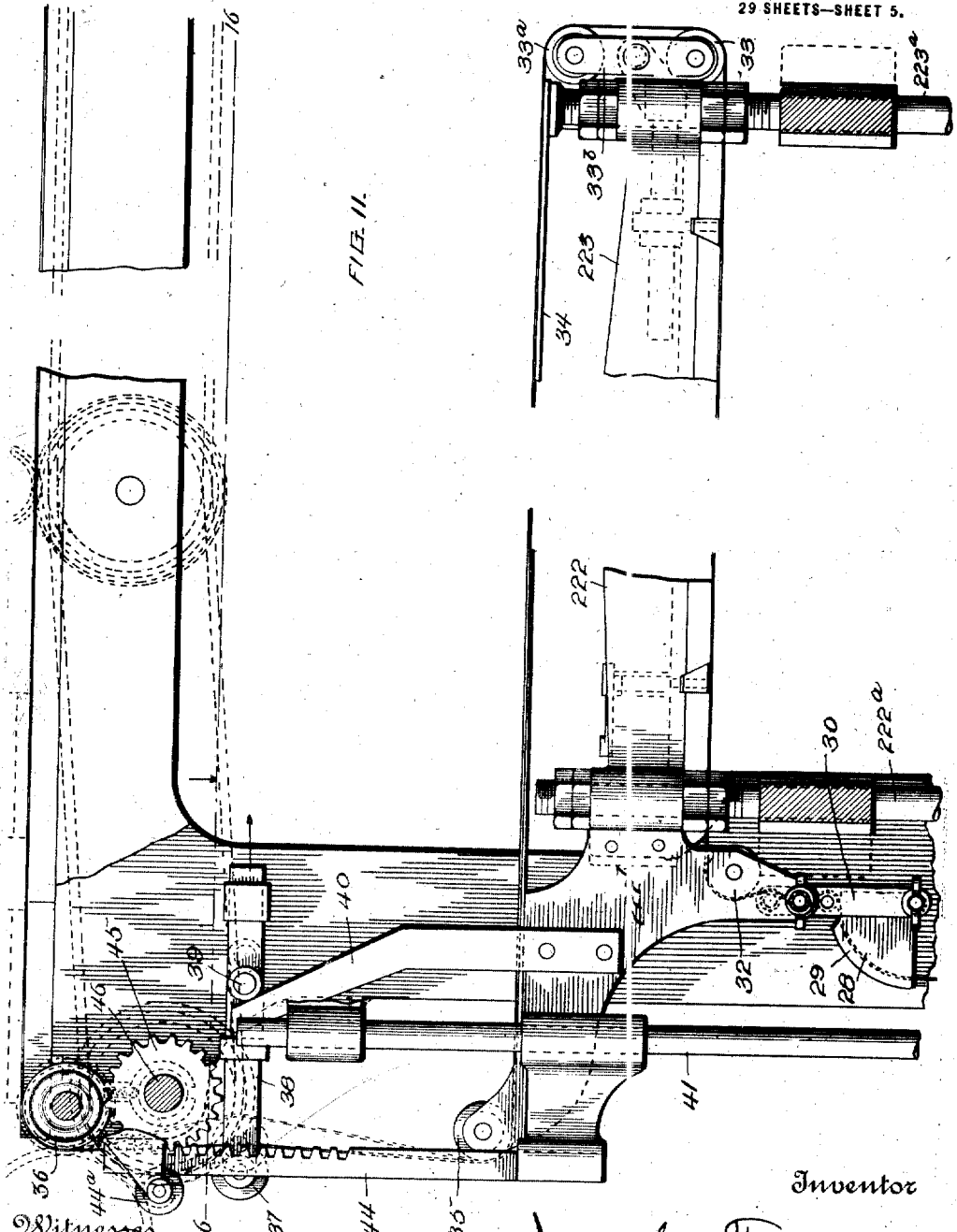

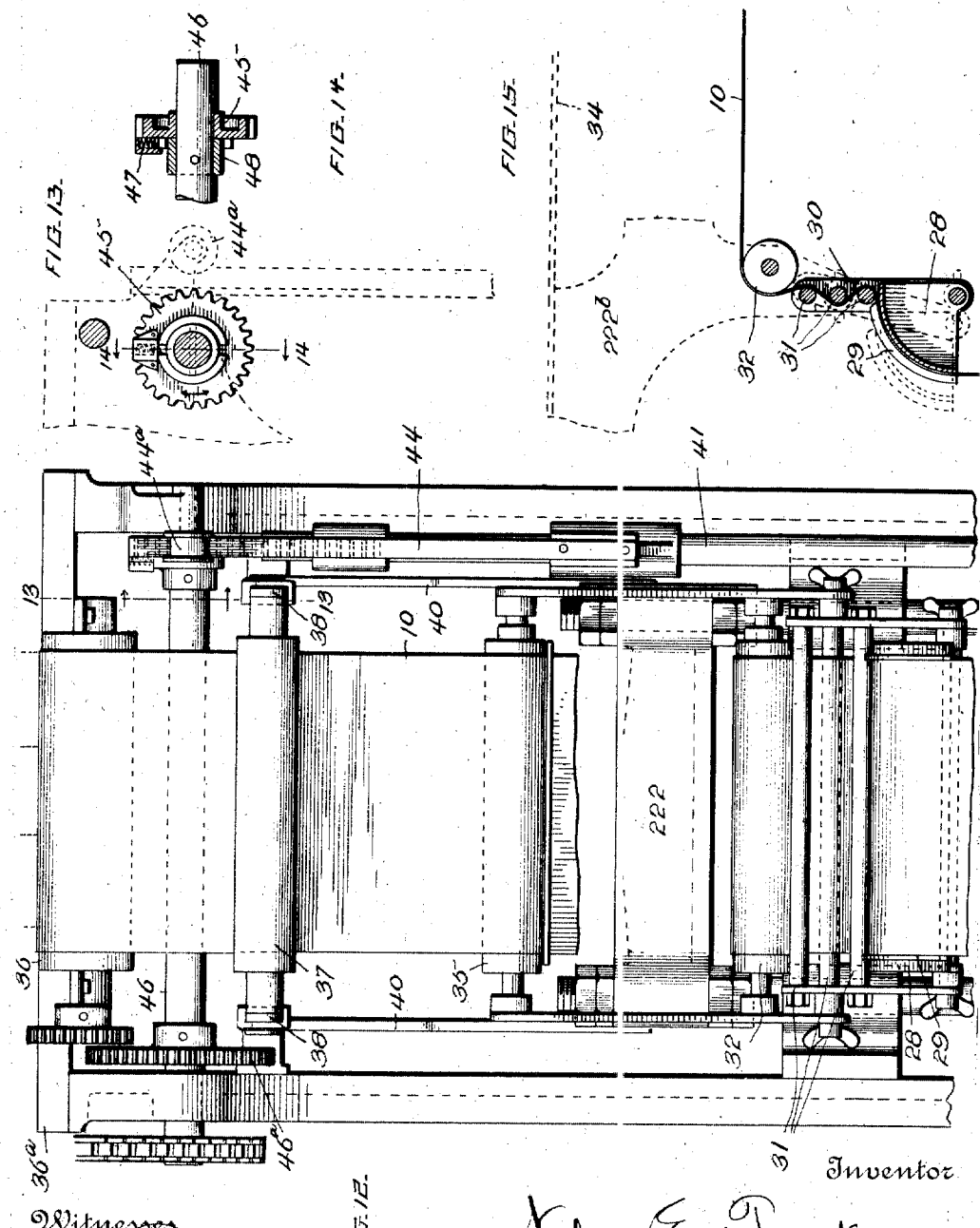

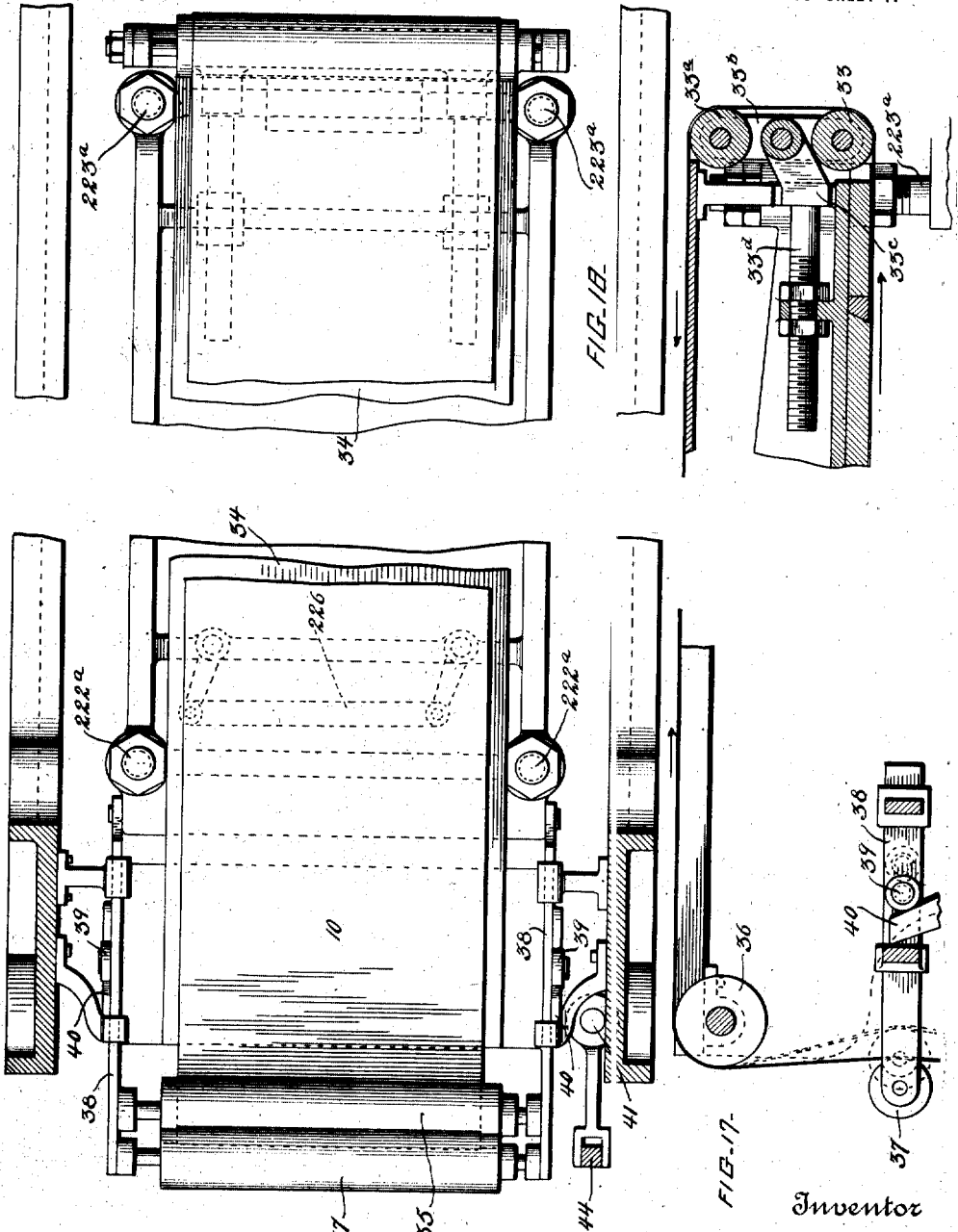

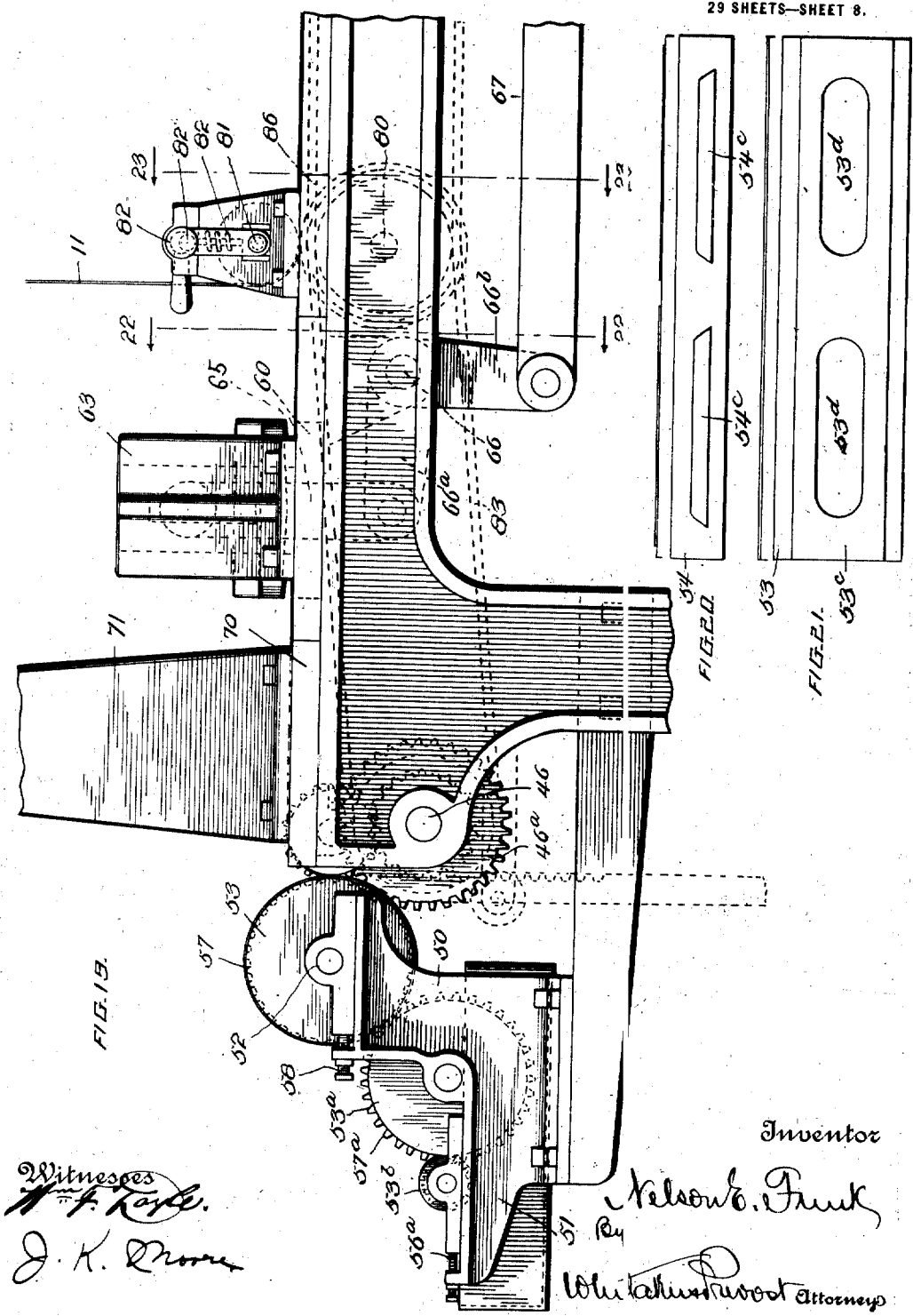

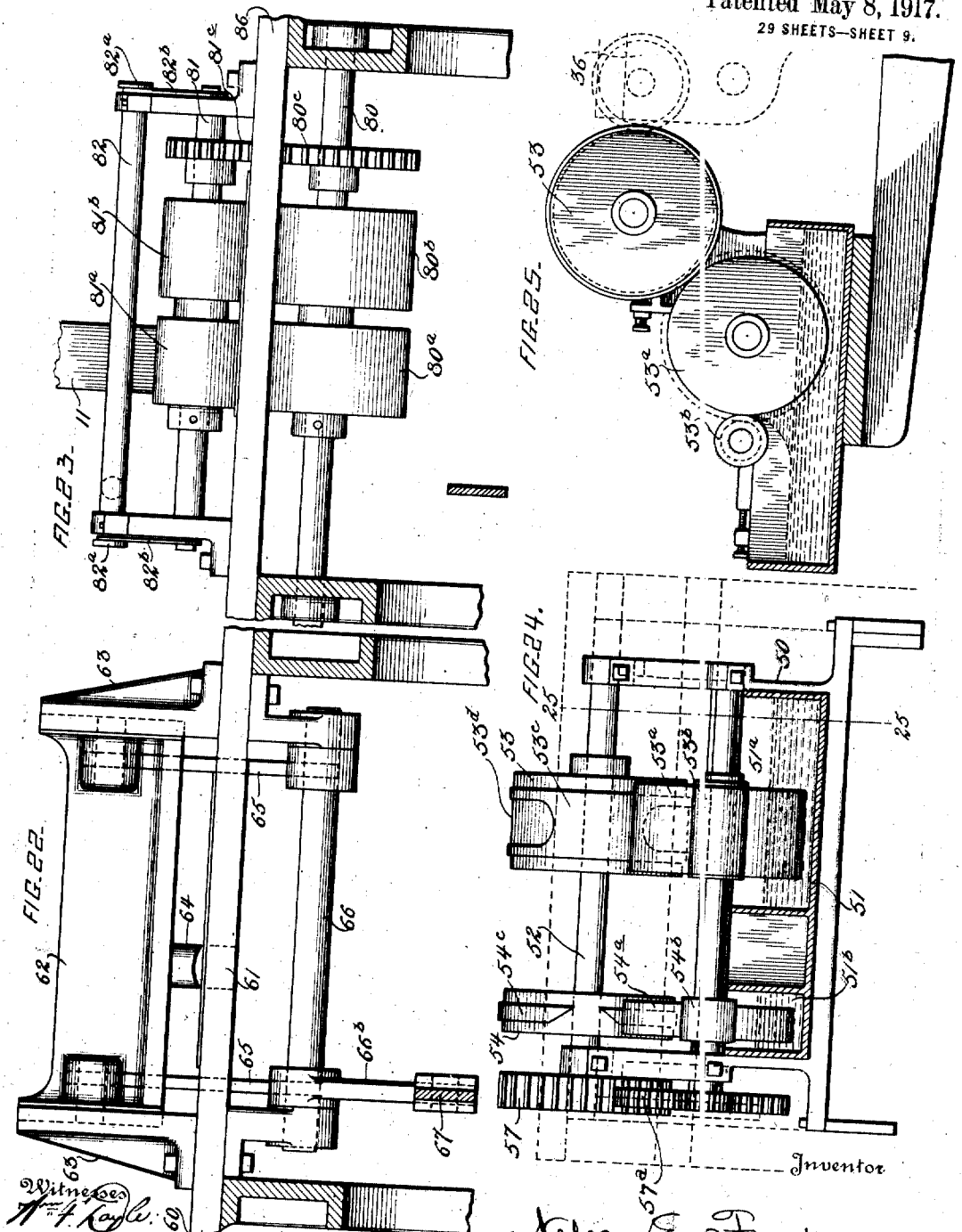

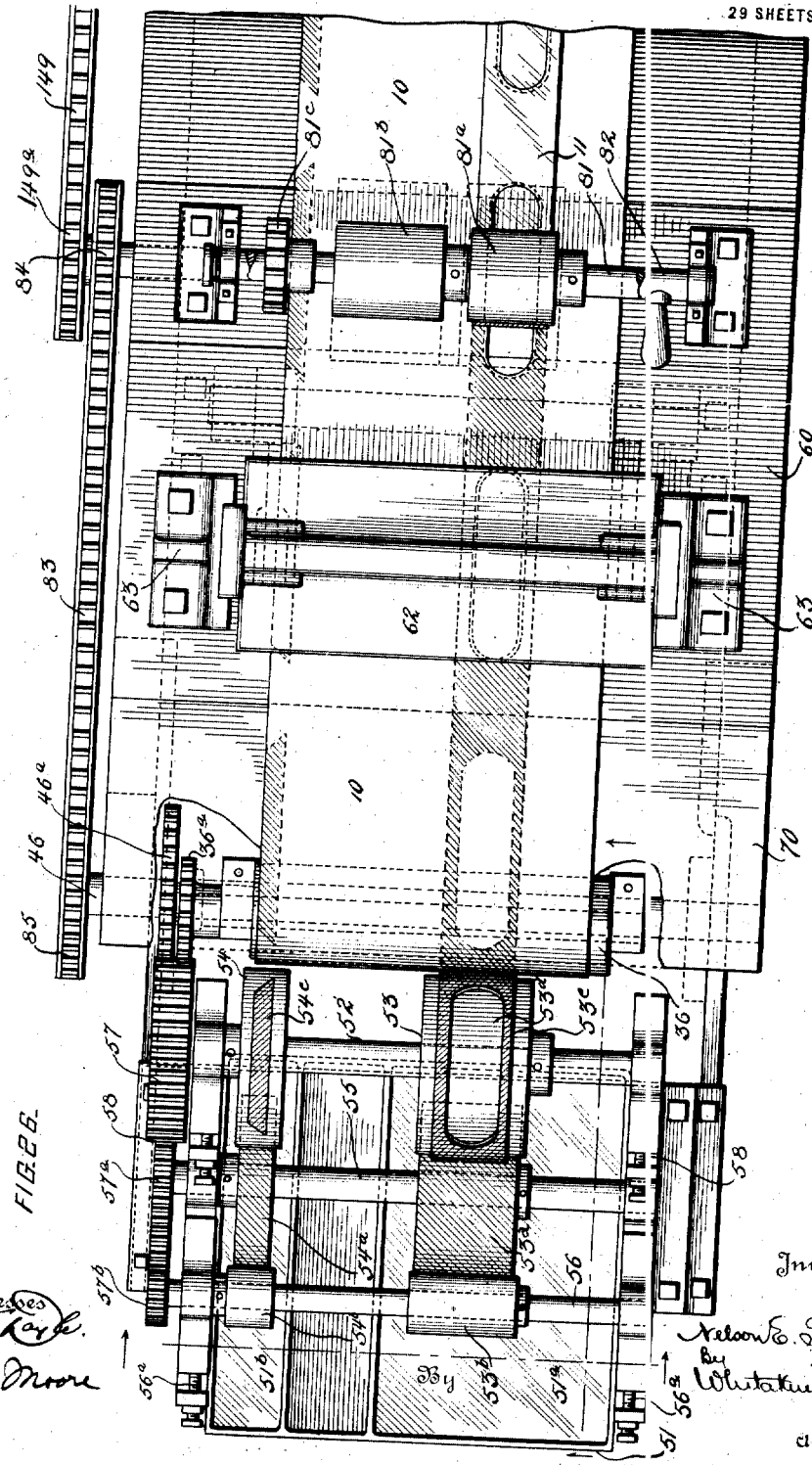

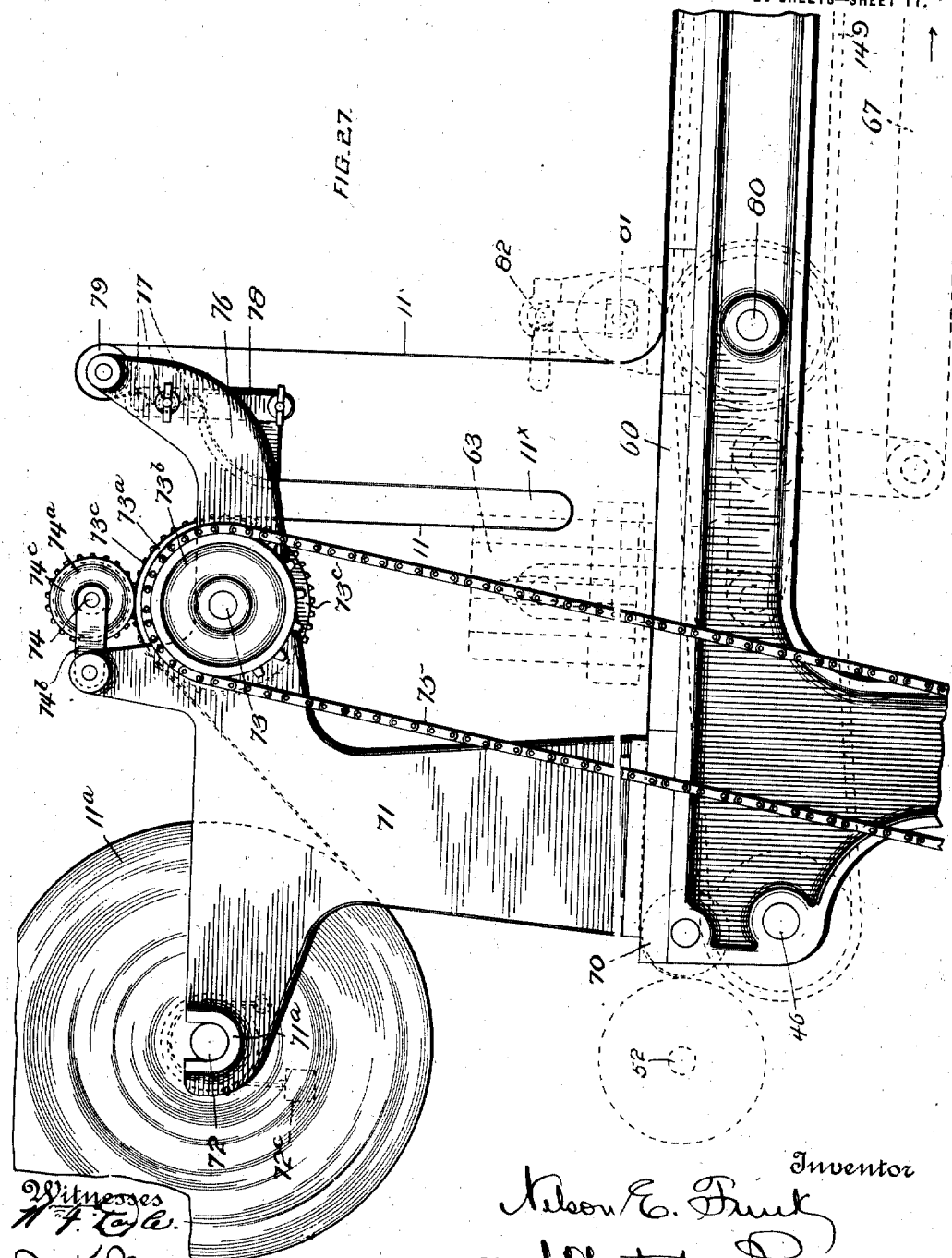

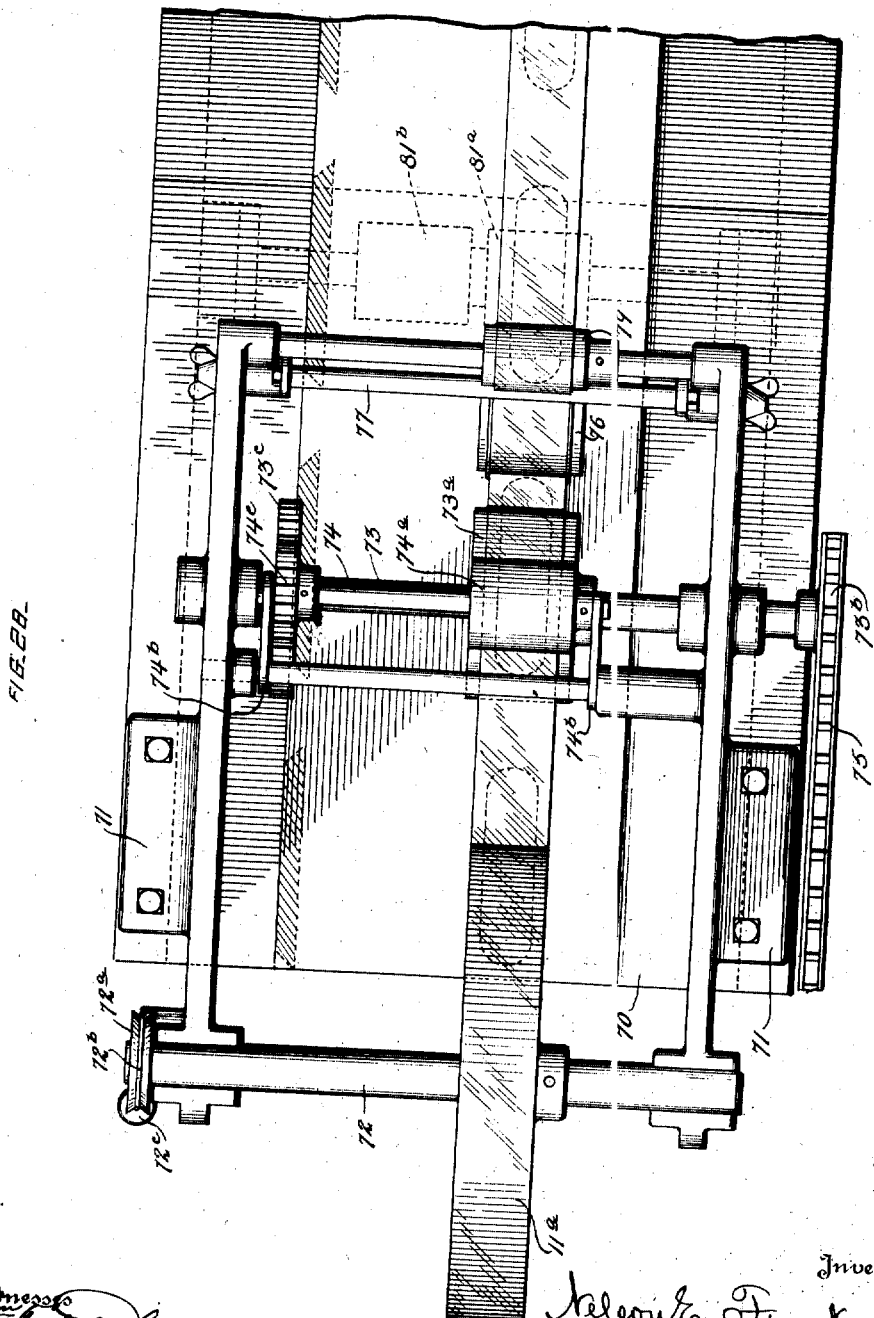

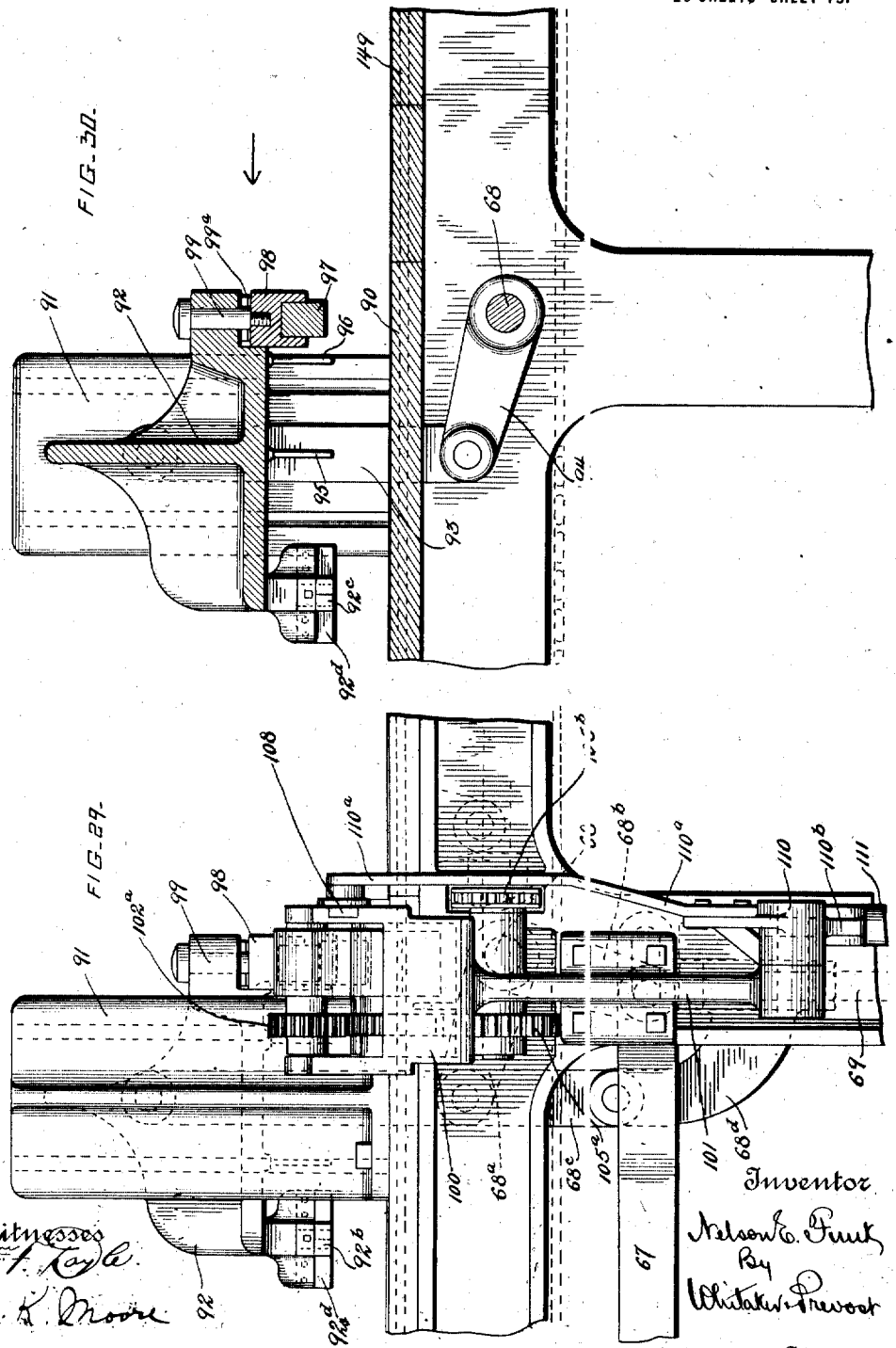

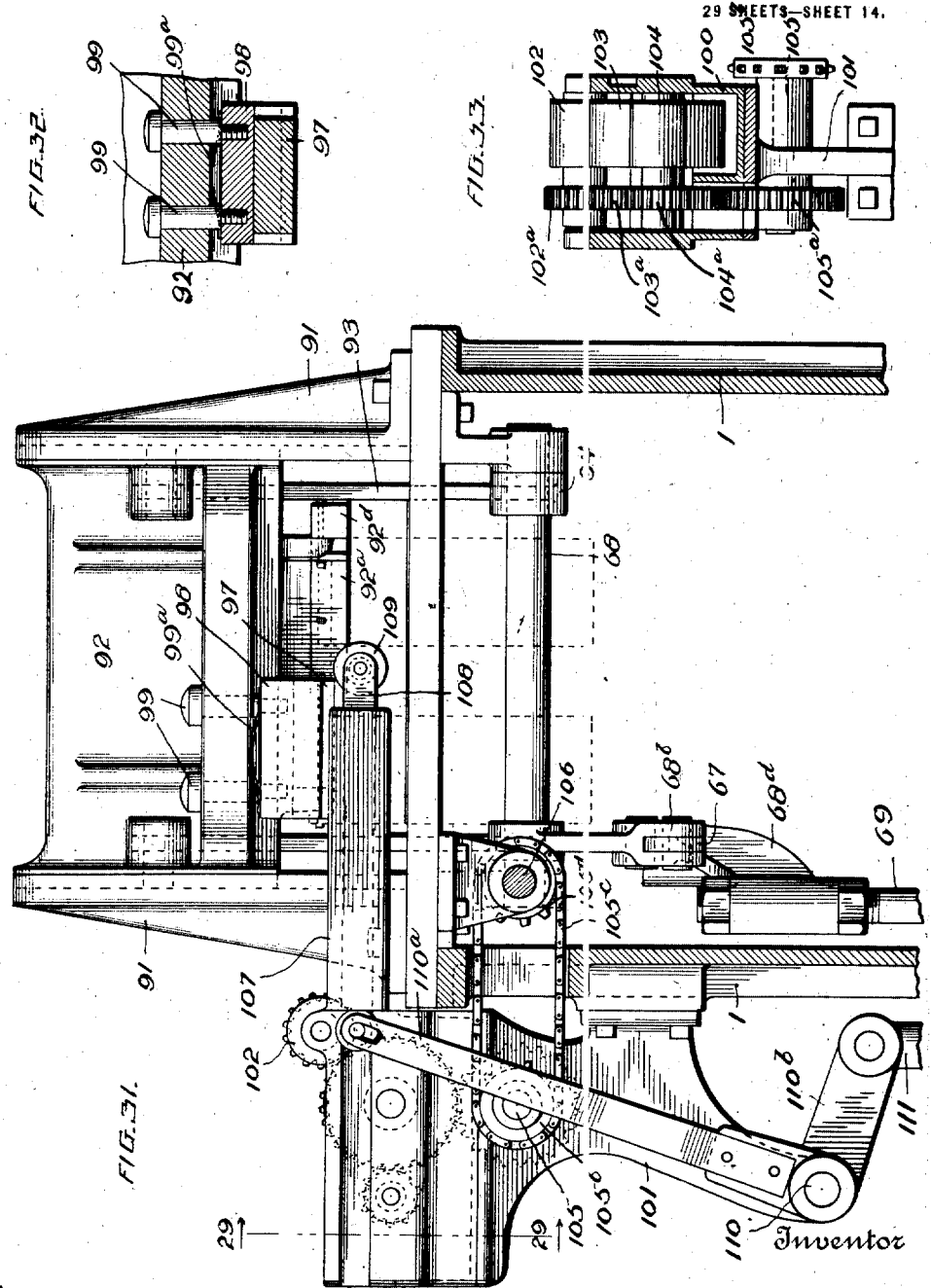

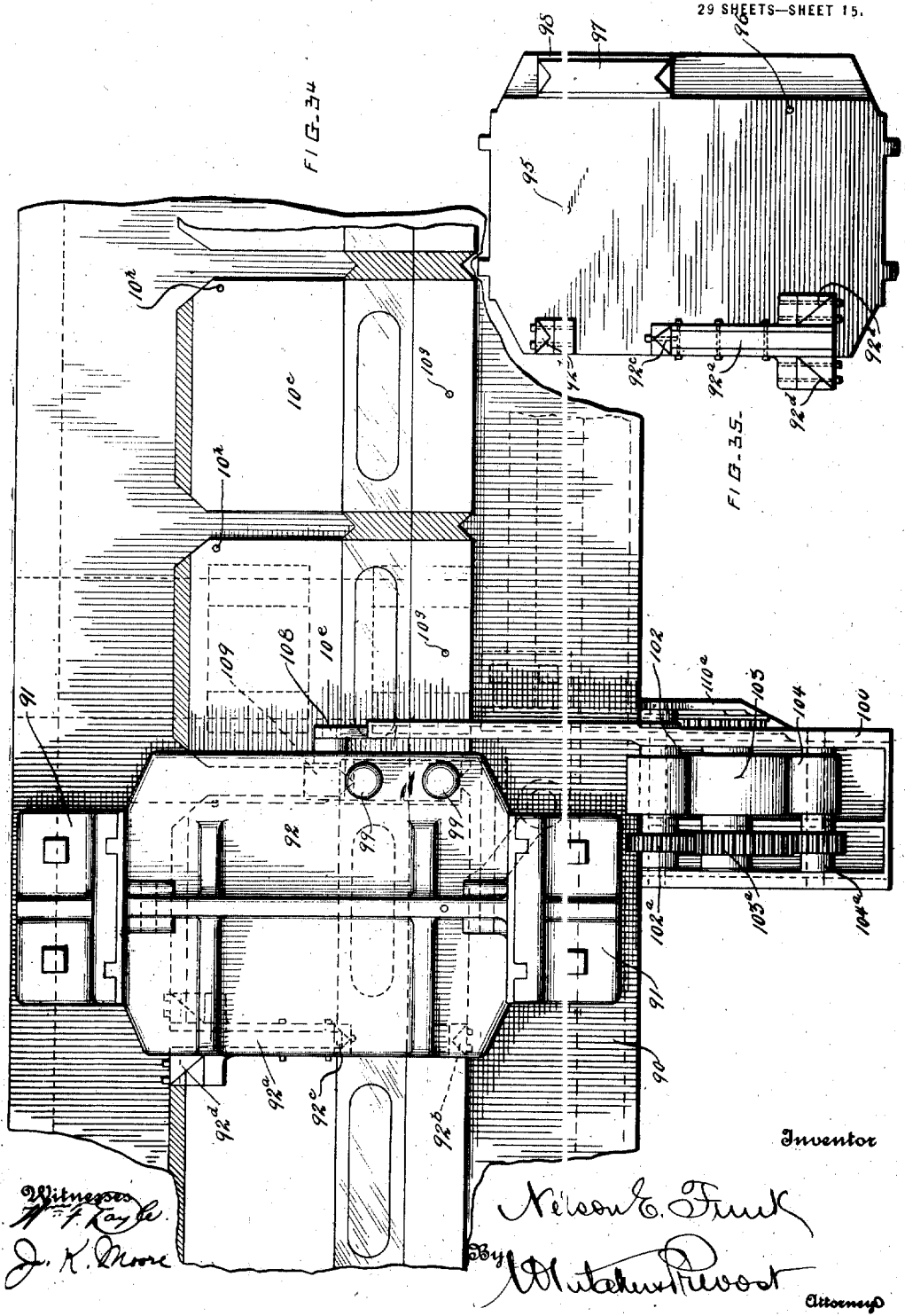

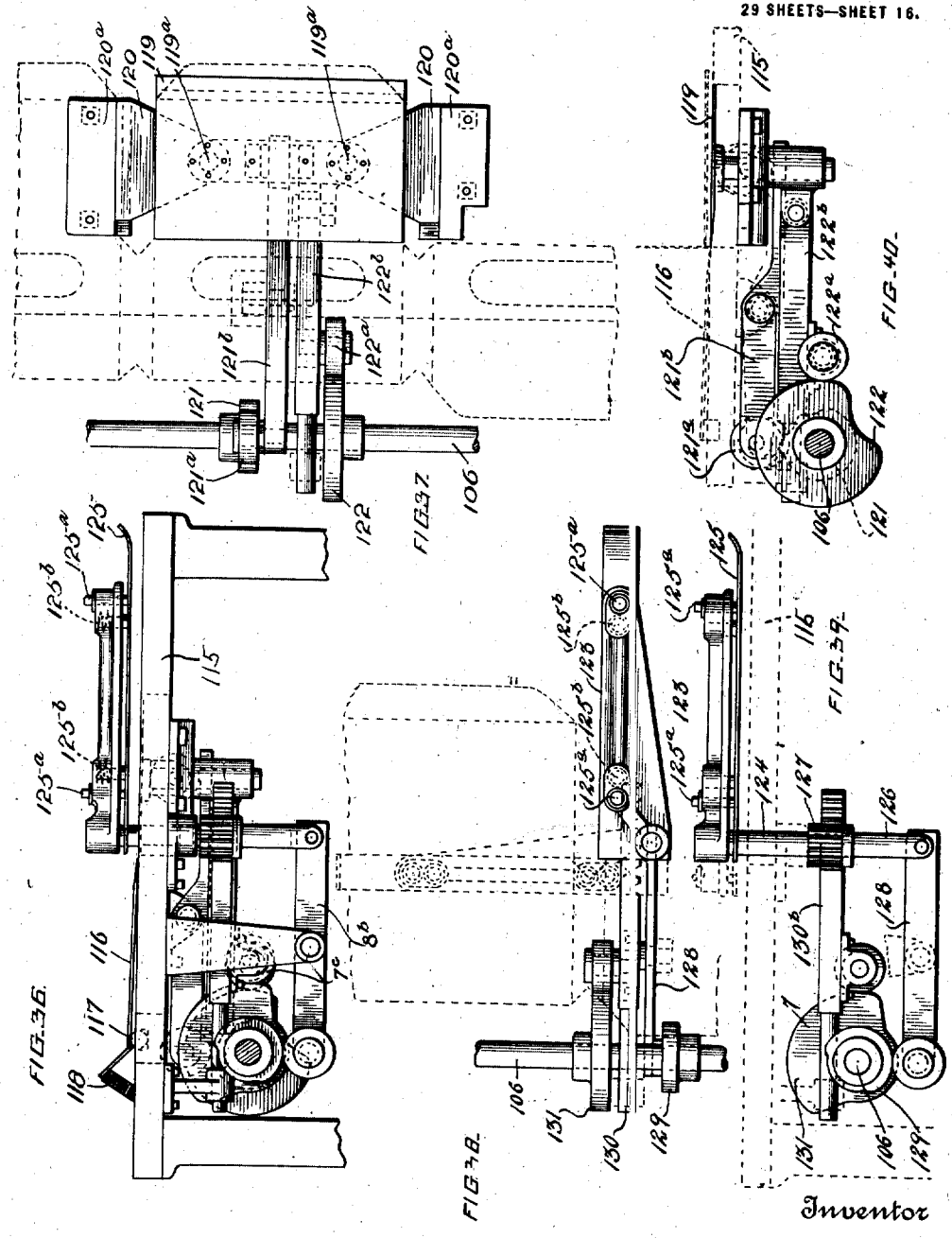

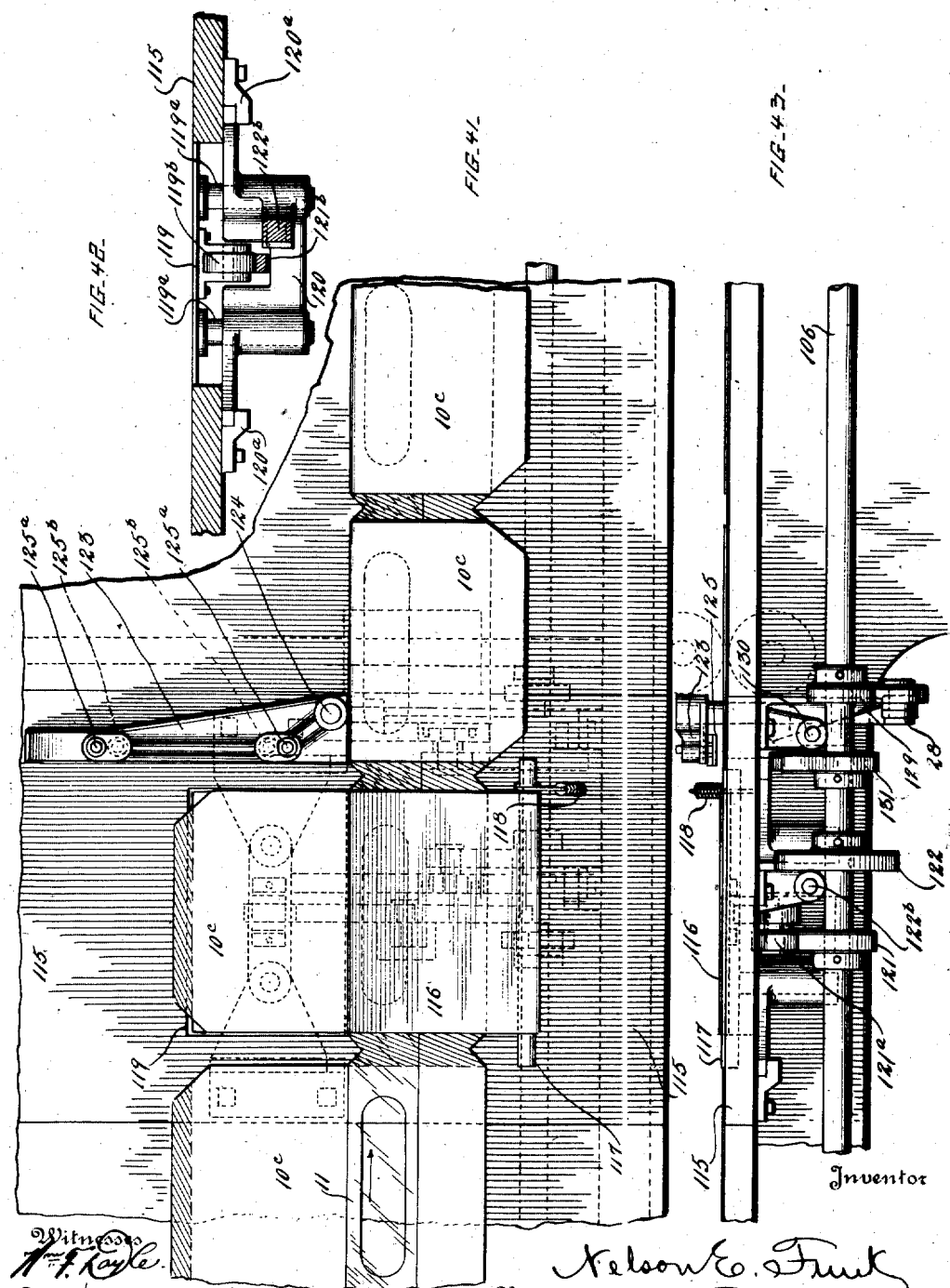

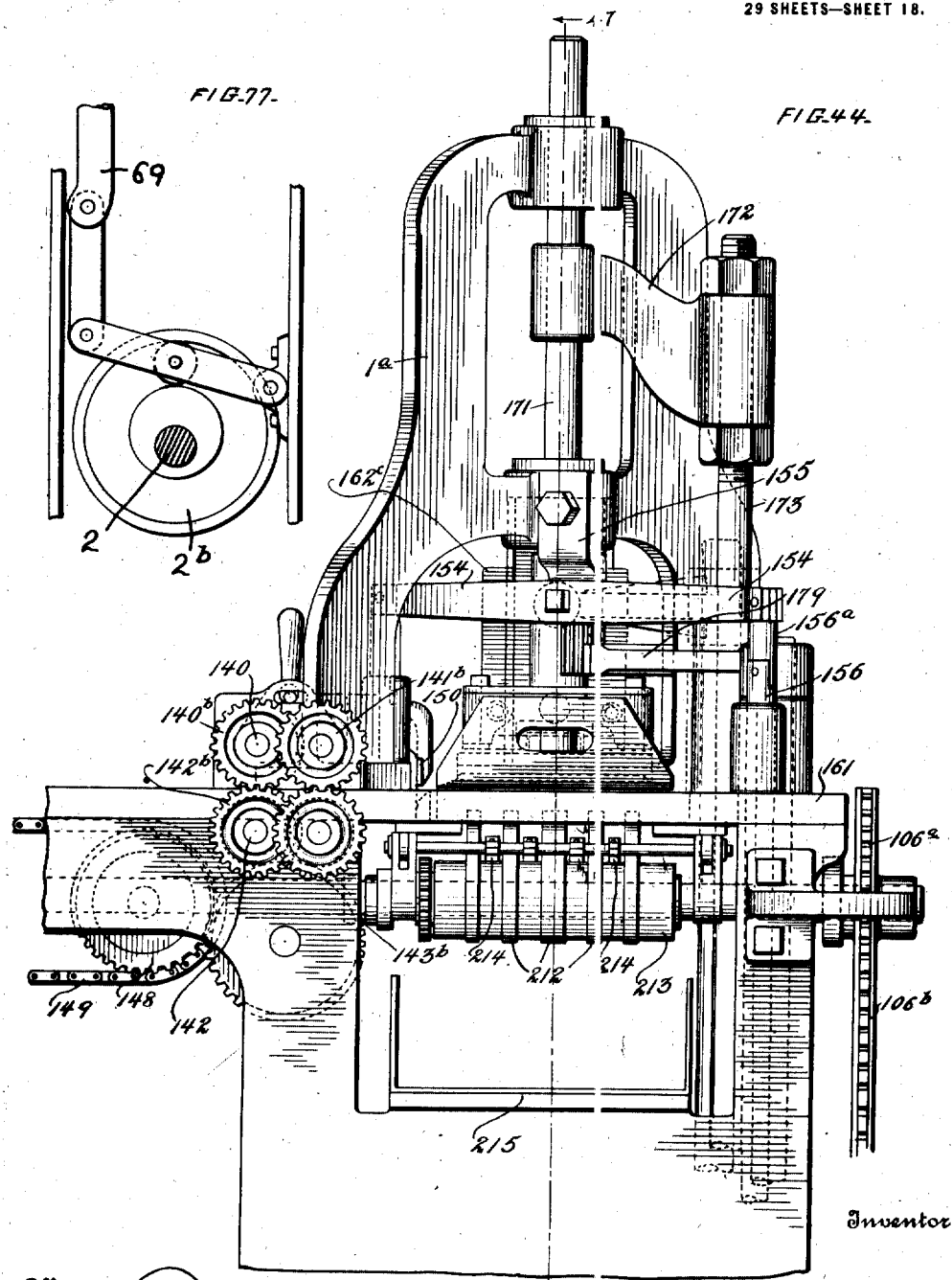

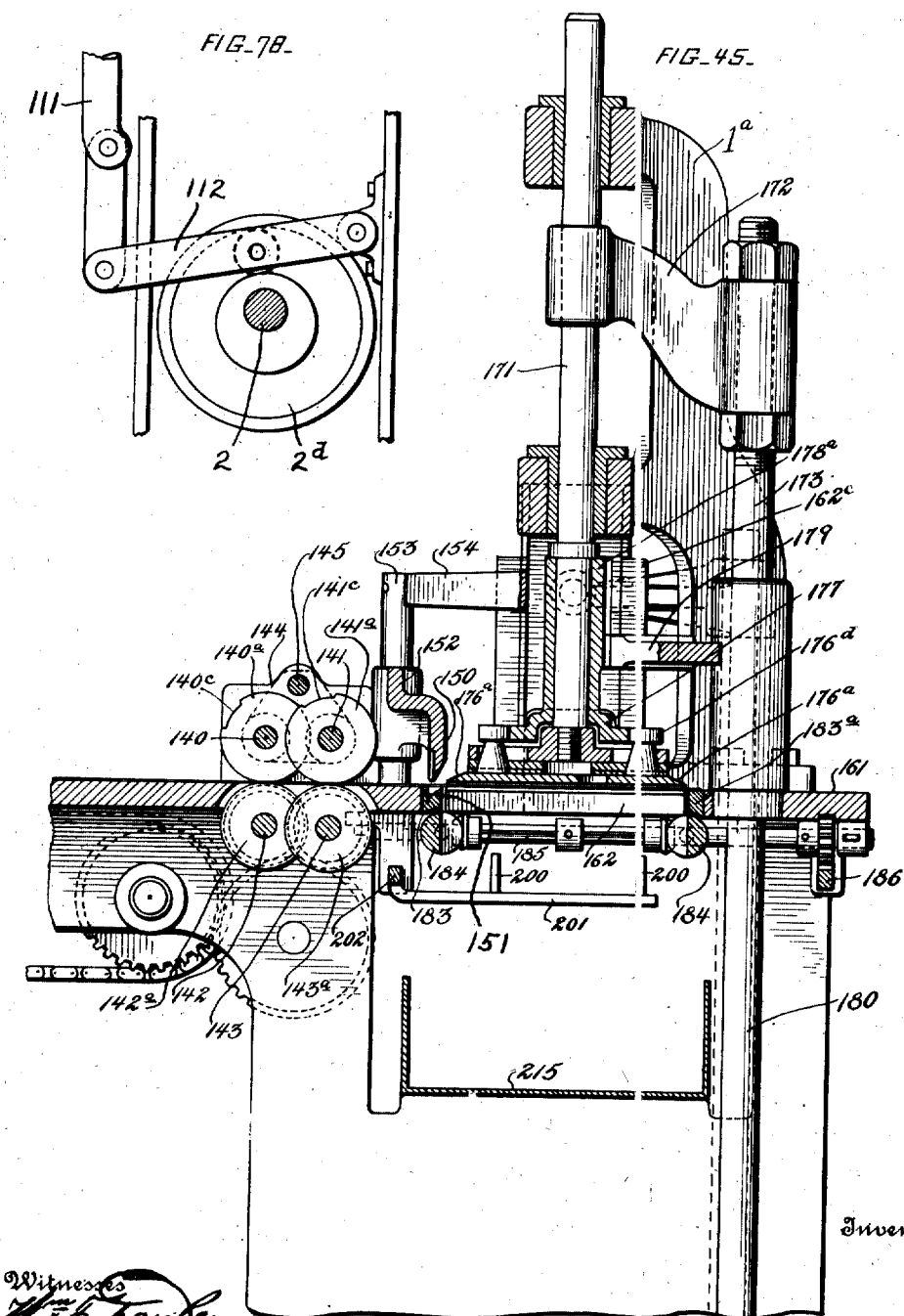

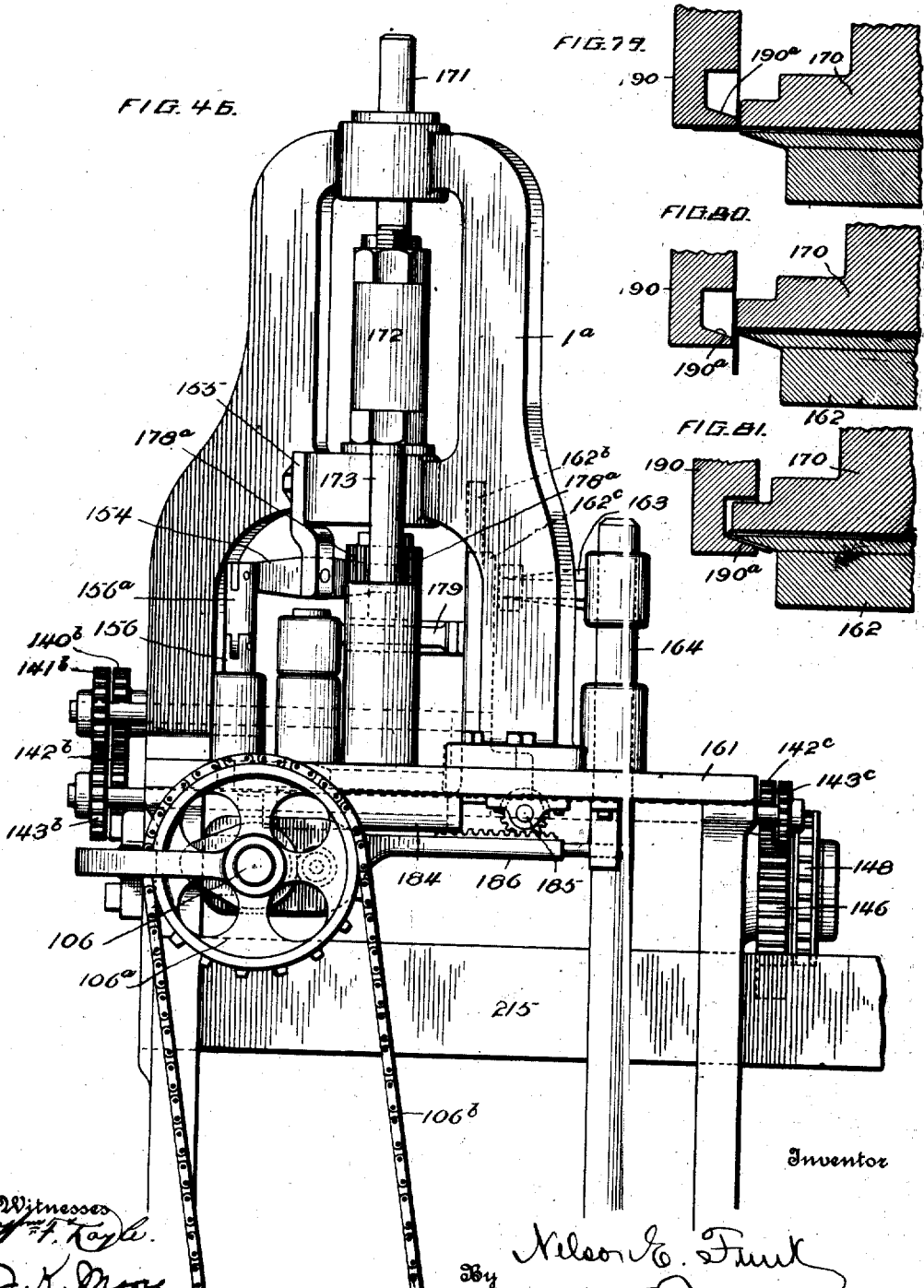

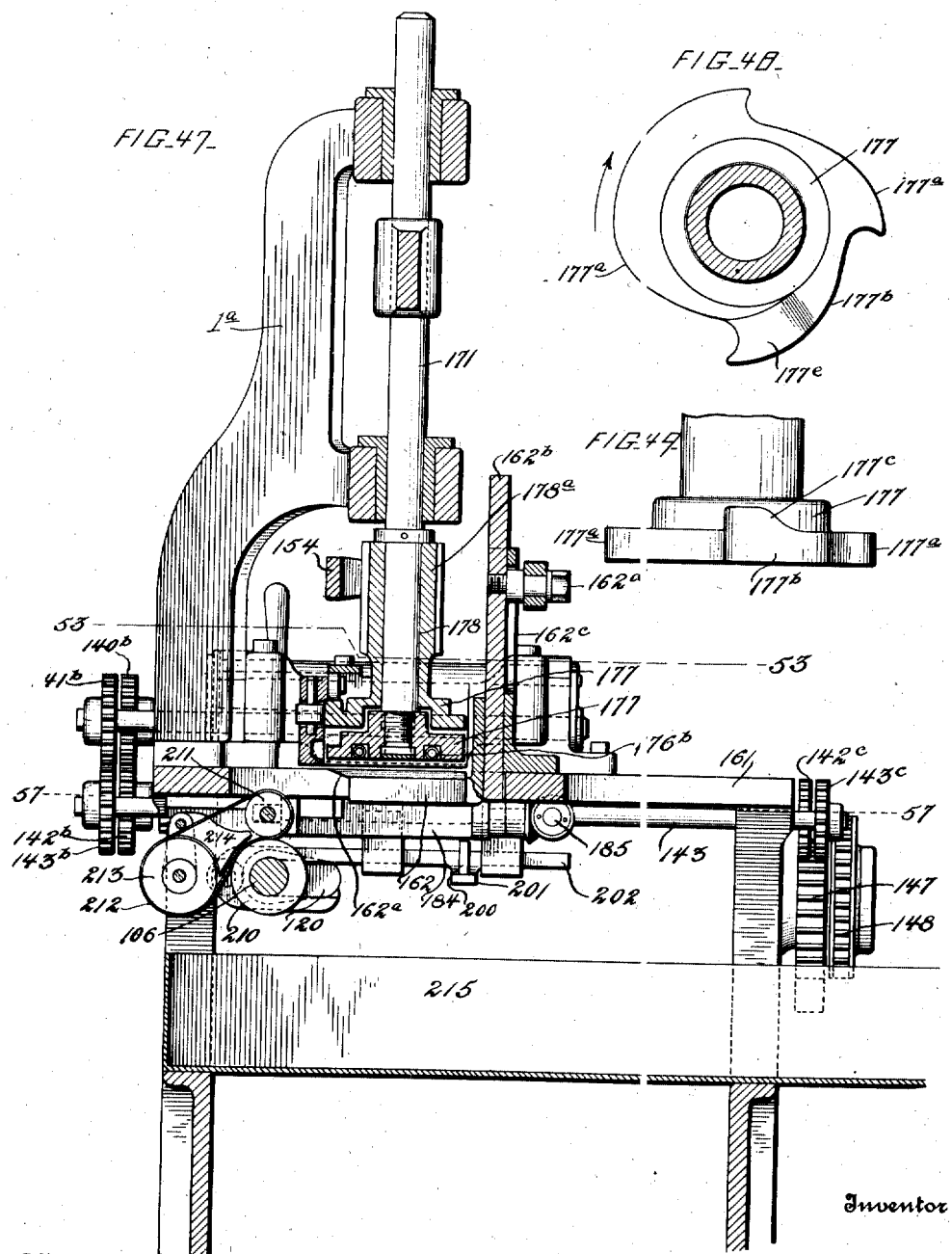

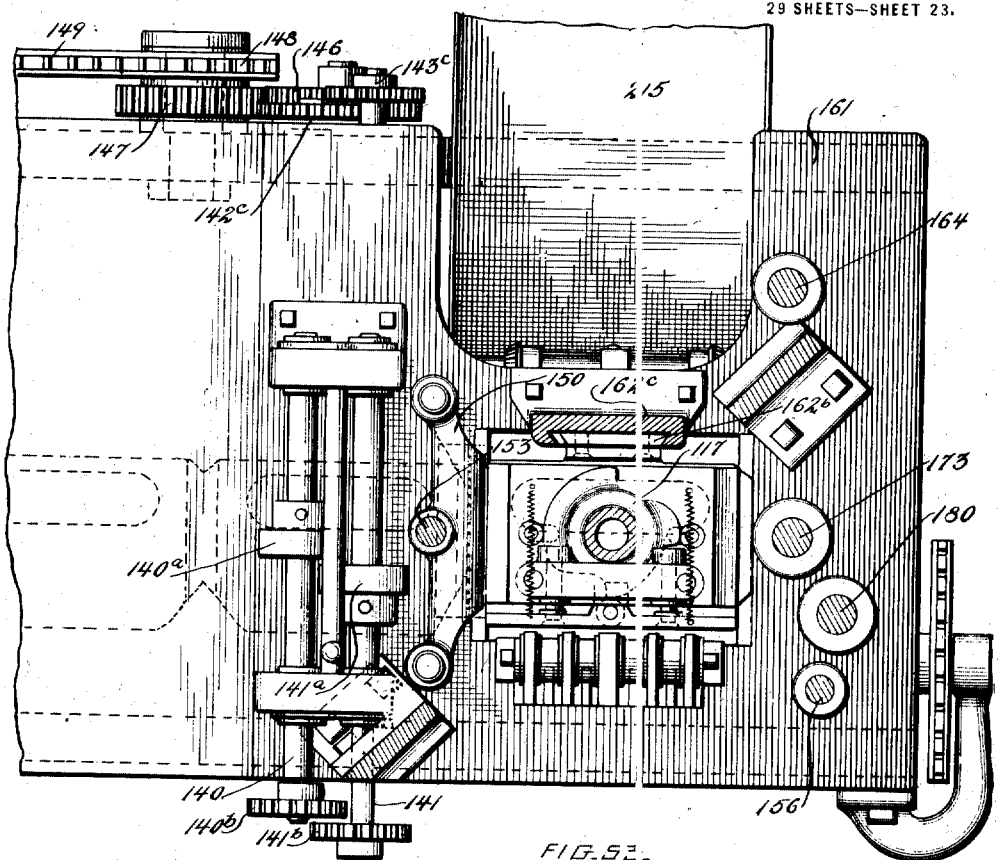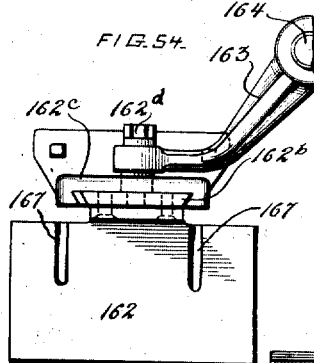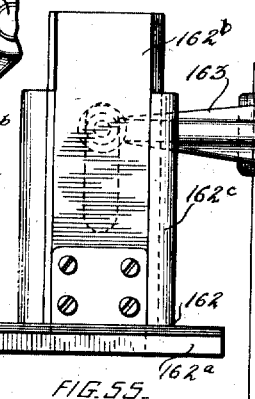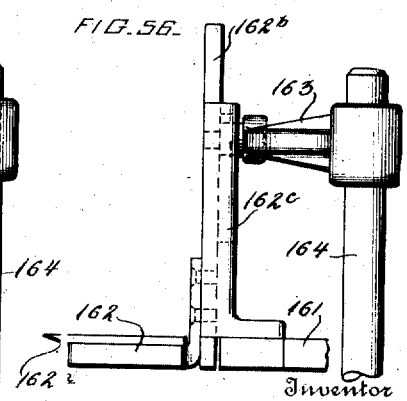

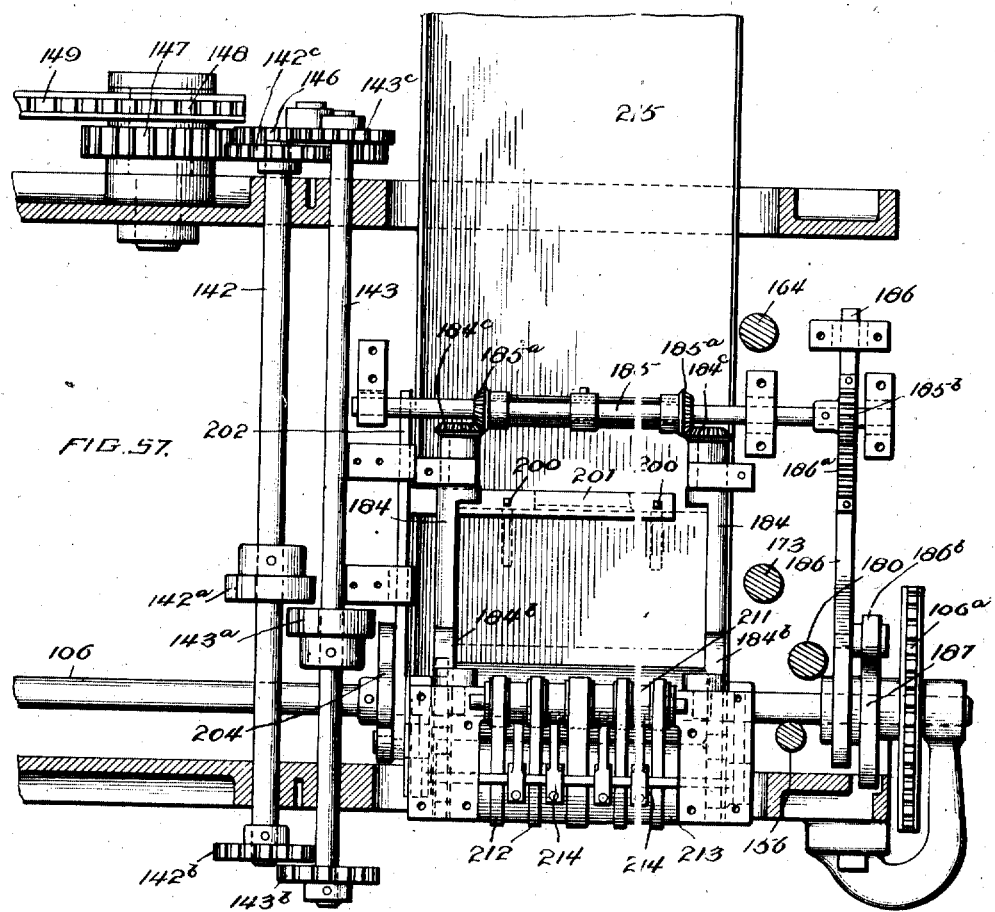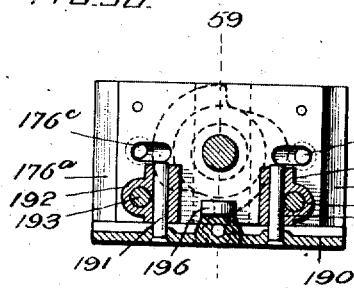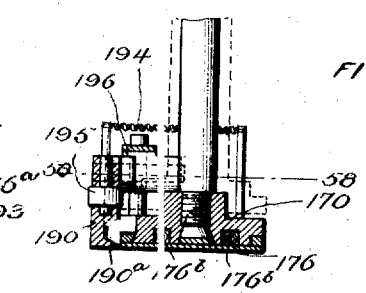

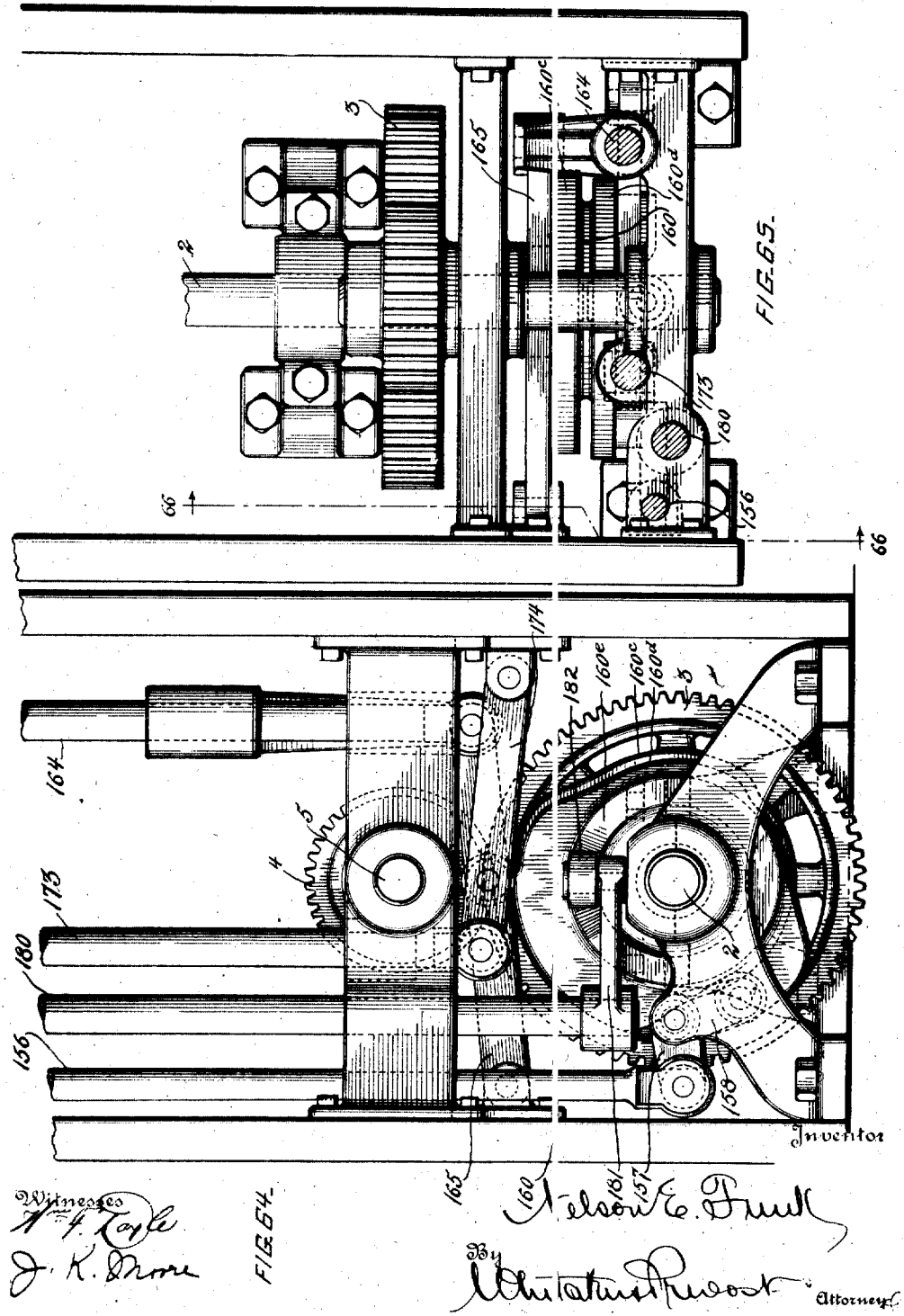

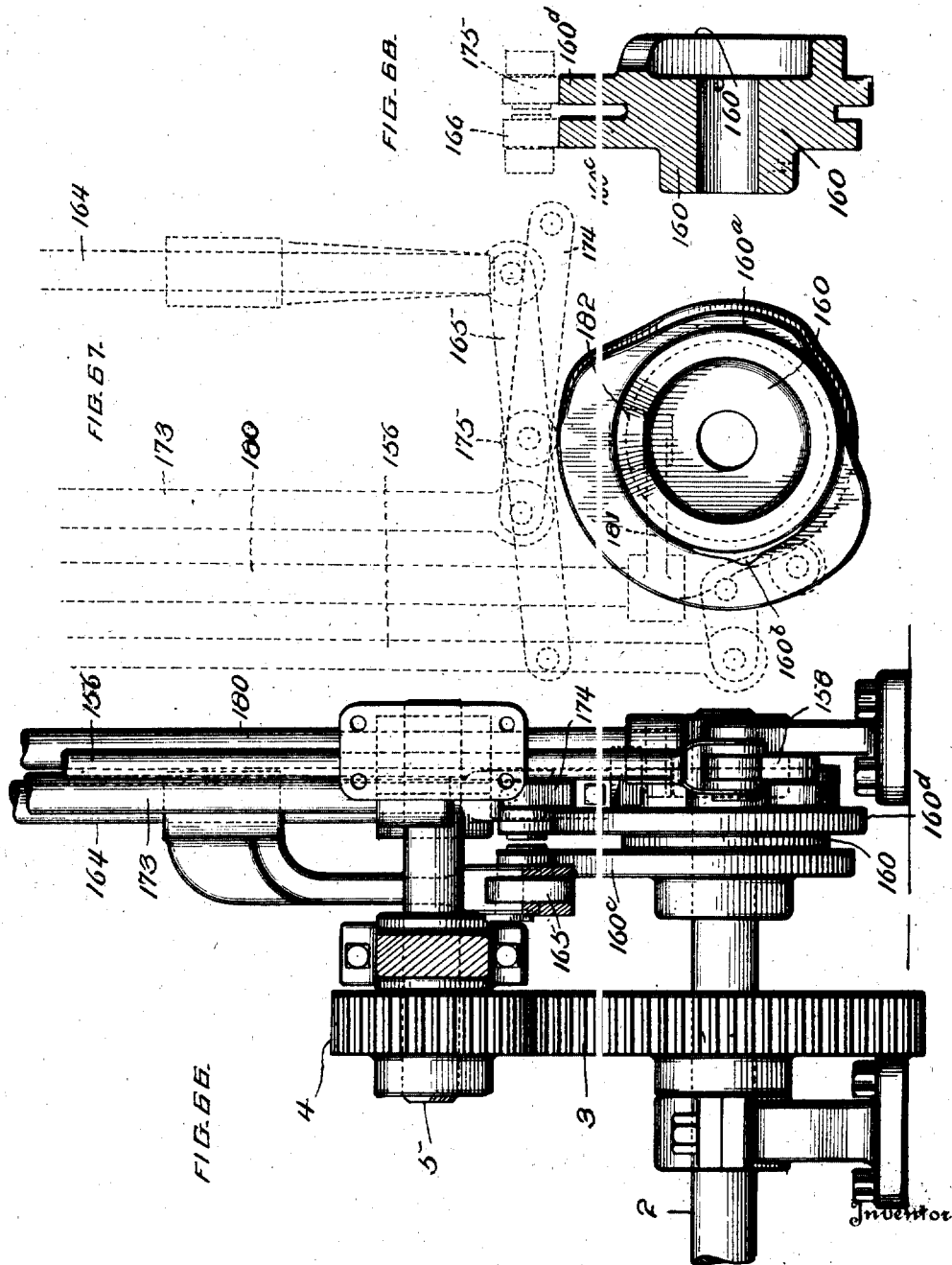

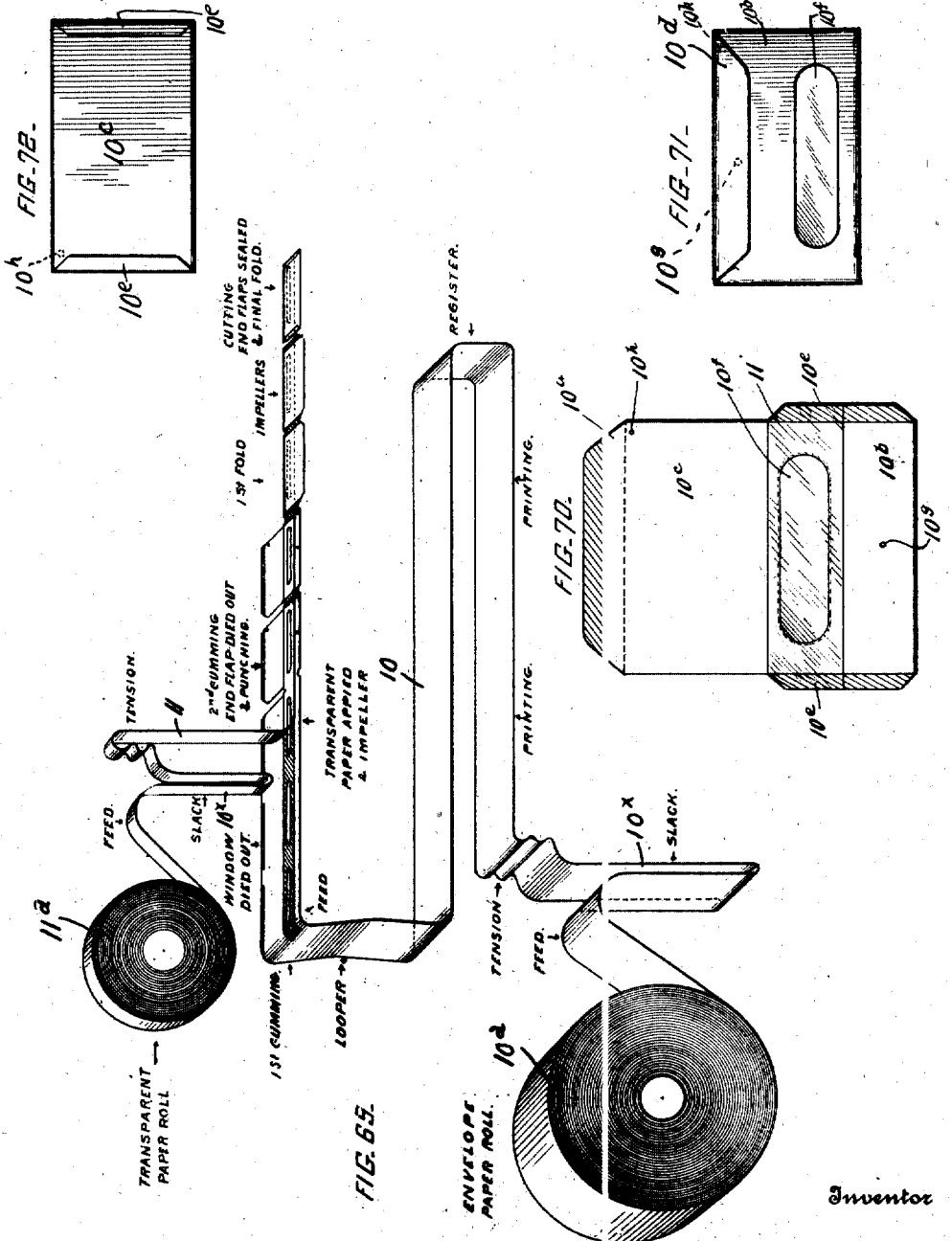

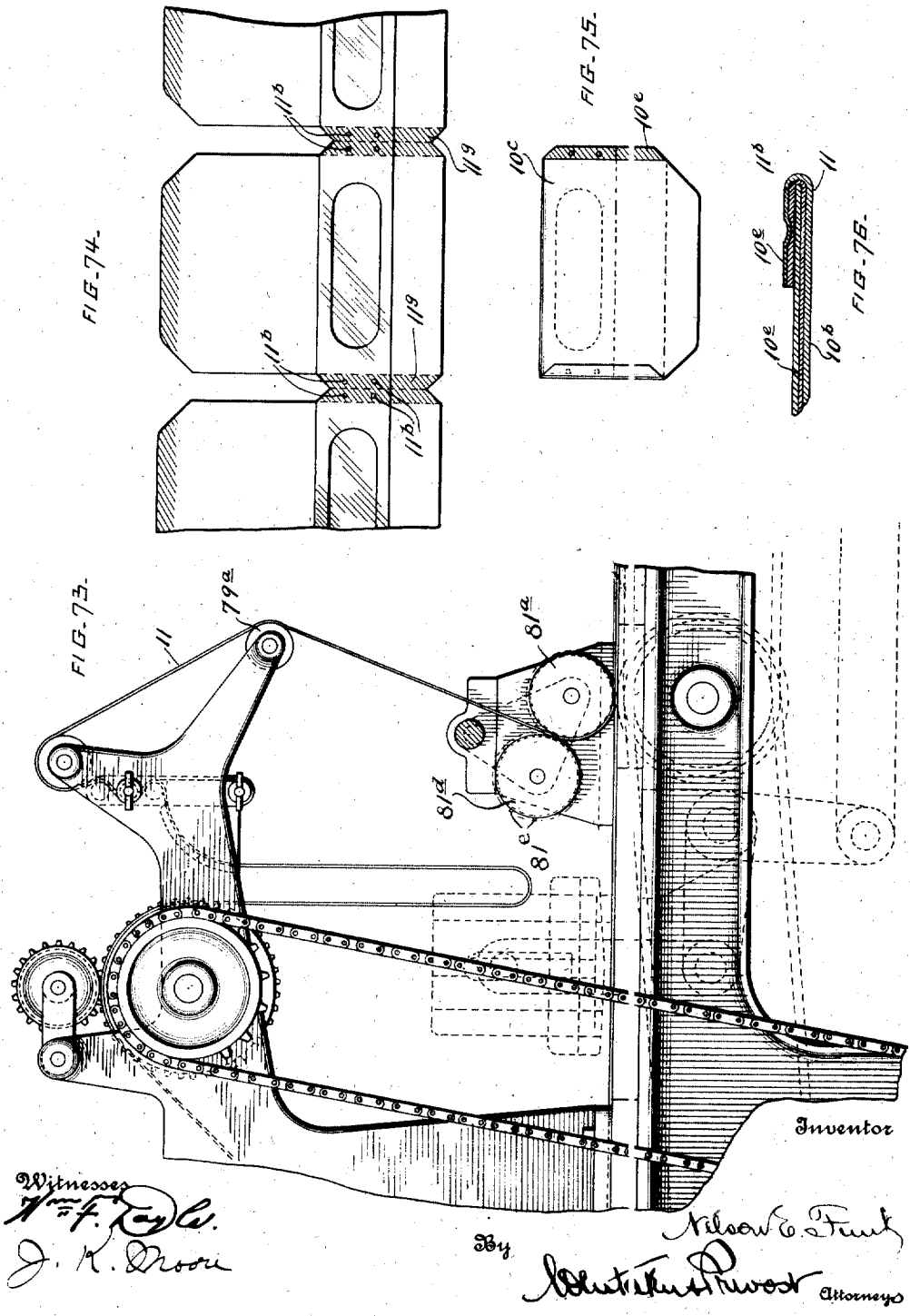

UNITED STATES PATENT OFFICE.

NELSON E. FUNK, OF MONTCLAIR, NEW JERSEY.

ENVELOP-MACHINE.

1,225,026.  Specification of Letters Patent.  Patented May 8, 1917.

Application filed November 4, 1913. Serial No. 709,221.

*To all whom it may concern:*

Be it known that I, NELSON E. FUNK, a citizen of the United States, residing at Montclair, in the county of Essex and State of New Jersey, have invented new and useful Improvements in Envelop-Machines; and I do hereby declare the following to be a full, clear, and exact description of the invention, such as will enable others skilled in the art to which it appertains to make and use the same.

My invention consists in the novel features hereinafter set forth, reference being had to the accompanying drawings which show one embodiment of my invention selected by me for the purpose of illustrating the same and the said invention is fully disclosed in the following description and claims.

The object of my invention is to provide a machine for the manufacture of envelops from a roll of paper which as it passes through the machine is gummed, died, or blanked, and partially folded without severing the individual envelops from the continuous sheet, the individual envelops being finally severed and the final folding operation performed thereon before the envelop is discharged from the machine. My invention also preferably provides mechanism for providing the address portion of the envelop with an aperture closed by a transparent sheet through which the address upon the inclosure may be viewed after the envelop is sealed, thus serving as the address of the envelop, and, in this connection, provides mechanism for dieing out the apertures or windows from the continuous sheet, applying adhesive material to the surrounding portions of the envelop and applying to the blank the transparent paper or fabric in the form of a continuous sheet of less width than the sheet forming the envelop body, and applying transparent fabric to the envelop sheet before the individual envelops are folded and severed as hereinafter described. In applying the transparent fabric the strip extends across those portions of the envelop strip which form the folds adjacent to the meeting ends of the several envelops and it is applied thereto so that when the individual envelops are severed and the final folds of the end flaps thereof are made, the end portions of the transparent strips are folded and sealed beneath the end folds of the envelops thereby more securely uniting the transparent strip to the body of the envelop.

My invention also contemplates the provision of that portion of the transparent strip which lies upon the end folds of the several envelops, with suitable apertures or perforations whereby when the end flaps are sealed down upon the body of the envelop, the end flaps of the envelop will seal through said apertures upon the body of the envelop proper in addition to being held thereto by their adhesion to the intervening portions of the transparent strip and the adhesion of said portions of the transparent strip to the envelop body, thereby still more firmly locking the end portions of the transparent strip and also securing a very firm seeking of the final folds of the end flaps of the envelop.

My invention also contemplates the provision of means for printing the envelop on one side of the continuous paper strip from which the envelops are formed in one or more colors during the passage of the said strip through the machine, also means for feeding the paper strip so as to secure the necessary registration thereof with the printing devices, adhesive applying devices, the dieing devices, and folding and severing means, and also feeding the continuous transparent fabric so as to secure the proper registration thereof with the main envelop blank strip.

My invention also contemplates where desired, disposing with the use of the transparent strip, and the adhesive applying, and dieing out mechanisms coöperating therewith, so that the envelop may be formed in the same machine without the window aperture and transparent covering therefor, if desired, and my invention also contemplates the manufacture of the envelops in this machine with the window opening only, where desired, without applying the transparent fabric thereto.

The particular envelop herein shown and described in connection with the embodiment of my invention which I have selected and shown herein for purposes of illustration, is not of my invention and forms no part thereof, the same being covered by a separate application filed in the United States Patent Office by Charles Lewis Benedict on or about February 23, 1913, and the envelop will not be therefore herein specifically claimed.

It is to be further understood that my improved machine is applicable to the manufacture of envelops differing in form and construction from the particular envelop herein shown and described, and particularly the apparatus for feeding the transparent fabric in the form of a continuous strip which is applied to the envelop before being severed from the strip, and particularly with reference to the application of such a continuous strip of transparent fabric upon a continuous strip from which the envelop is died, perforated, and supplied with adhesive material, and to which the transparent strip is firmly and adhesively united before the individual envelops are separated from the continuous envelop strip.

Referring to the accompanying drawings, which show as before stated one embodiment of my invention, selected by me for purposes of illustration, Figure 1 (Sheet 1) is a side elevation of an improved machine embodying my invention and provided with mechanism for feeding an envelop blank strip therethrough, printing the same if desired, applying adhesive to portions only of the blank strip for sealing the flaps and securing the transparent material, dieing out the window aperture, and blanking the envelops while remaining as integral parts of the strip, feeding the transparent fabric in a continuous strip, applying the same to the envelop blank strip, before severing the individual envelops therefrom, partially folding the envelop blank strip while still remaining integral, and finally severing the individual envelops, folding and sealing the final folds thereof and folding the sealing flap and delivering the envelops individually.

Fig. 2 (Sheet 2) is an end view of the machine showing an electric motor operatively connected therewith for driving the machine.

Fig. 3 (Sheet 2) is a partial side elevation similar to Fig. 1 of a portion of the machine adjacent to the mechanism for making the final fold, part of the framing being broken away to show the parts beneath and part of the main driving shaft being broken away.

Fig. 4 (Sheet 2) is a vertical section of the machine on line 4—4 of Fig. 3, looking toward the left in that figure.

Fig. 5 (Sheet 3) is an enlarged detailed view of the means for supporting the roll of the envelop blank strip and feeding or drawing off the strip therefrom.

Figs. 6 and 7 (Sheet 3) are details of part of the feeding or strip impelling devices shown in Fig. 5.

Fig. 8 (Sheet 4) is a vertical section on line 8—8 of Fig. 5 looking in the direction of the arrows adjacent to side line of section.

Figs. 9 and 10 (Sheet 4) are details of the mechanism supporting and tensioning the envelop blank strip roll, enlarged.

Figure 60:
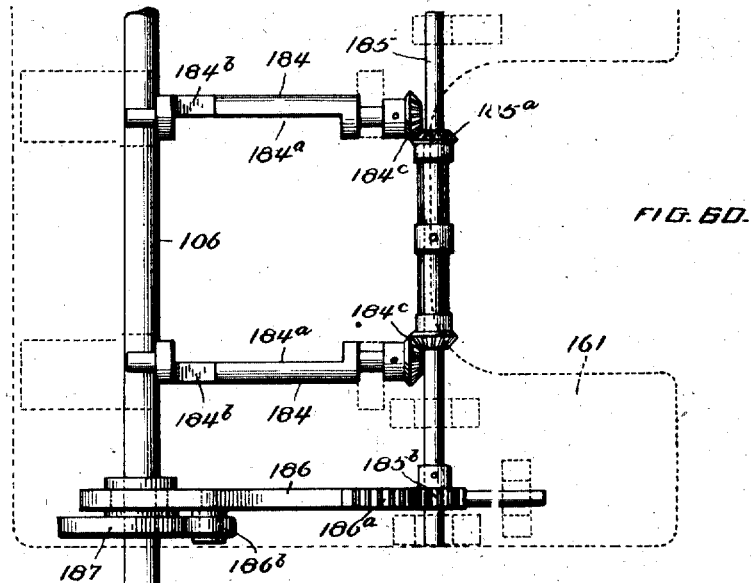

Fig. 11 (Sheet 5) is an enlarged detail view of a part of the mechanism showing the means for actuating the take-up mechanism for the envelop blank strip, and for imparting intermittent movement to the devices for applying adhesive to the sealing flap and that portion of the envelop surrounding the window opening, also mechanism for tensioning the said strip between the drawing off mechanism and the printing mechanism.

Fig. 12 (Sheet 6) is a front elevation of the parts illustrated in Fig. 11.

Fig. 13 (Sheet 6) is a detailed sectional view on line 13—13 of Fig. 12 looking in the direction of the arrows.

Fig. 14 (Sheet 6) is a detailed sectional view on line 14—14 of Fig. 13 looking in the direction of the arrows.

Fig. 15 (Sheet 6) is a detailed sectional view of the tensioning device shown in Fig. 11.

Fig. 16 (Sheet 7) is a horizontal sectional view on line 16—16, Fig. 11, looking in the direction of the arrow, portions being broken away.

Figs. 17 and 18 (Sheet 7) are detailed sectional views of parts illustrated in Fig. 16.

Fig. 19 (Sheet 8) is an enlarged detailed elevation of a portion of the machine showing the main gumming apparatus, the window punching die, and envelop blank strip impeller located adjacent thereof.

Fig. 20 (Sheet 8) is a diagrammatic view of the peripheral surface of the gumming die roll for applying gum to the sealing flap portion of the envelop blank strip.

Fig. 21 (Sheet 8) is a similar view of the peripheral surface of the gumming die roll for applying gum to portions of the blank strip adjacent to the window aperture.

Fig. 22 (Sheet 9) is a sectional view on line 22—22 of Fig. 19 looking in the direction of the arrows.

Fig. 23 (Sheet 9) is a similar section on line 23—23 of Fig. 19 looking in the direction of the arrows.

Fig. 24 (Sheet 9) is a detailed elevation of the main gumming apparatus taken from the end of the machine, the gumming receptacle being shown in section.

Fig. 25 (Sheet 9) is a vertical section on line 25—25 of Fig. 24.

Fig. 26 (Sheet 10) is a top view of the parts shown in Fig. 19, showing the envelop blank strip with the gum applied thereto and the transparent paper strip applied over the window apertures, the roll of transparent strip and devices for supporting and feeding the same being removed.

Fig. 27 (Sheet 11) is a detailed side elevation of a portion of the machine showing the roll of transparent paper and the feeding or drawing off mechanism therefor, the window forming die and impeller adjacent thereto being shown in dotted lines, and the gumming device being removed, and the gumming die rolls being indicated in dotted lines.

Fig. 28 (Sheet 12) is a top plan view of the parts shown in Fig. 27, showing also the envelop blank strip.

Fig. 29 (Sheet 13) is an enlarged detail view of the mechanism for cutting out portions of the envelop blank strip, between adjacent envelop blanks, punching the blank, and for gumming the portions of the blank forming the end sealing flaps.

Fig. 30 (Sheet 13) is a sectional view of the same taken longitudinally of the machine.

Fig. 31 (Sheet 14) is an end view of the same apparatus shown in Figs. 29 and 30, looking in the direction of the arrow in Fig. 30.

Fig. 32 (Sheet 14) is a detail sectional view of the end flap gumming pad.

Fig. 33 (Sheet 14) is a detailed sectional view of the gum applying mechanism therefor.

Fig. 34 (Sheet 15) is a top plan view of the parts shown in Fig. 31.

Fig. 35 (Sheet 15) is a bottom plan view of the vertically movable head shown in Figs. 29 to 34, carrying the cutting and punching dies and the gumming pad.

Figs. 36, 37, 38, 39, and 40 (Sheet 16) are detailed views of the mechanism for making the first fold of the envelop bank strip.

Fig. 41 (Sheet 17) is a top plan view of a portion of the machine illustrating the mechanism for forming the first fold of the envelop blank strip and showing the envelop blank strip previous to and after the folding operation, in connection therewith.

Figs. 42 and 43 (Sheet 17) are further details of the mechanism for making the first fold.

Fig. 44 (Sheet 18) is an enlarged detail of the delivery end portion of the machine, showing the mechanism for severing the individual envelops, sealing the end flaps, and folding the sealing flap, and delivering the envelops, which mechanism I term for convenience of reference, the final folding mechanism.

Fig. 45 (Sheet 19) is a vertical sectional view of the parts shown in Fig. 44 taken longitudinally of the machine.

Fig. 46 (Sheet 20) is an elevation of the said parts taken from the rear end of the machine.

Fig. 47 (Sheet 21) is a vertical section on line 47—47 of Fig. 44, looking in the direction of the arrows.

Figs. 48 and 49 (Sheet 21) are enlarged detailed plan and elevation respectively, of the cam for actuating portions of the final folding mechanism.

Fig. 50 (Sheet 22) is a top plan view of the final folding mechanism.

Figs. 51 and 52 (Sheet 22) are detail views of parts of the mechanism for actuating the cam shown in Figs. 48 and 49.

Fig. 53 (Sheet 23) is a horizontal section on line 53—53 of Fig. 47.

Figs. 54, 55, and 56 (Sheet 23) are detail views of the supporting platen and mechanism for supporting and actuating the same.

Fig. 57 (Sheet 24) is a horizontal sectional view on line 57—57 of Fig. 47.

Figs. 58 and 59 (Sheet 24) are detail sectional views of the folding plunger and mechanism for folding and creasing the sealing flap.

Fig. 60 (Sheet 25) is a detail view of the devices for folding and sealing the end flaps of the envelop and the operating mechanism therefor.

Figure 61:
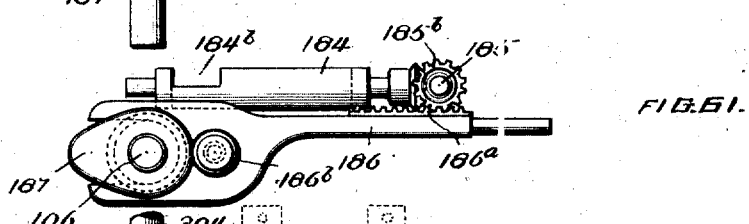

Fig. 61 (Sheet 25) is an end view of the parts shown in Fig. 60.

Figure 62:
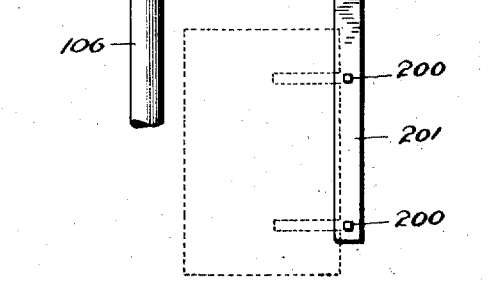

Fig. 62 (Sheet 25) is a plan view of the knock-out mechanism and its operating cam.

Figure 63:
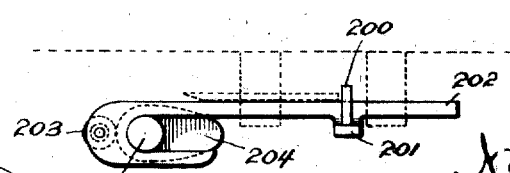

Fig. 63 (Sheet 25) is a side elevation of the device shown in Fig. 62.

Fig. 64 (Sheet 26) is an enlarged elevation of the lower portion of the delivery end of the machine with the driving and balance wheels removed from the driving shaft and the vertically disposed actuating rolls broken away.

Fig. 65 (Sheet 26) is a plan view of the mechanism shown in Fig. 64.

Fig. 66 (Sheet 27) is a vertical section longitudinal of the machine, on line 66—66 of Fig. 65, looking in the direction of the arrows.

Fig. 67 (Sheet 27) is a detail view of the multiple cam for actuating portions of the final folding mechanism, the parts actuated thereby being indicated in dotted lines.

Fig. 68 (Sheet 27) is a sectional view of the said cam showing in dotted lines above the same two of the friction rolls attached to parts actuated hereby.

Fig. 69 (Sheet 28) is a diagrammatic view illustrating the course of the envelop blank strip and the transparent fabric strip through the machine, and indicating the various operations which are performed thereon in the manufacture of the envelop.

Fig. 70 (Sheet 28) represents a detail view of the single envelop opened out, and showing the gummed portions, the window aperture, and punched apertures, and the transparent fabric applied to a portion of the envelop.

Fig. 71 (Sheet 28) is a front view of the completed envelop.

Fig. 72 (Sheet 28) is a rear view of the same.

Fig. 73 (Sheet 29) is a detail view of a portion of the mechanism for feeding and applying the transparent strip and illustrating a slight modification of the machine, whereby the said transparent strip is perforated in those portions thereof which are applied to the end flap portions of the envelop blank strip to enable said flaps to be sealed through said perforations to the portions of the envelop beneath said flaps.

Fig. 74 (Sheet 29) is a detail view of a portion of the envelop blank strip and the transparent strip applied thereto showing the envelops partially blanked, and gummed, and illustrating the location of the said apertures.

Fig. 75 (Sheet 29) shows a view of the envelop formed by this modification of the machine, one of the sealing flaps being sealed down and the other left unfolded.

Fig. 76 (Sheet 29) is an enlarged sectional view of a portion of the envelop through the end sealing flap illustrating the manner of sealing the same, through the apertures in the transparent strip, to the portions of the envelop beneath.

Fig. 77 (Sheet 18) represents a partial transverse sectional view through the central portion of the machine illustrating the connection between the levers for actuating the window cutting die and the head carrying the partial blanking die and the gumming pad from the main shaft.

Fig. 78 (Sheet 19) is a detail sectional view of part of the machine showing the means for operating the roller which applies gum to the transverse gumming pad, from the main driving shaft.

Figs. 79, 80, and 81 (Sheet 20) are detail views of parts of the final folding mechanism, partly broken away and showing progressively the folding and creasing of the sealing flap of the envelop.

In the embodiment of my invention shown in the accompanying drawings, 1 represents the main frame of the machine which is so constructed as to accommodate the working parts thereof and the various instrumentalities which operate upon the materials from which the envelops are formed, are arranged preferably in groups or units, as hereinafter described so that each separate unit may be removed from the machine frame intact without disassembling the parts thereof, for purposes of adjustment or repair or to give access to other parts of the mechanism. 2 represents the main driving shaft which is mounted in suitable bearings in the lower part of the main frame and extends longitudinally thereof. This shaft is provided adjacent to the delivery end of the machine, with a gear wheel 3 in mesh with a pinion 4 on a short actuating shaft 5, carrying a suitable belt wheel 6 and balance wheel 7 for imparting motion to the driving shaft and its connected mechanism from a suitable source of power, as from a motor 8, connected to the belt wheel 6, by belt 9, as shown in Fig. 2.

The paper from which the body of the envelop is made consists of a continuous strip 10 which preferably is furnished to the machine in a roll as indicated at $10^a$, the width of the strip being equal to the vertical width of the envelop blank, that is to say, the vertical width of the envelop when spread out in a plane as shown in Fig. 70. In order that the construction and operation of the machine may be more clearly understood, I will first describe the envelop which it is designed to make, which envelop, in itself, forms no part of my present invention. This envelop comprises a rectangular front portion $10^b$, a rectangular back portion $10^c$, a longitudinal sealing flap $10^d$ connected to the outer edge of the back portion, and the end sealing flaps $10^e$ which extend laterally from the ends of the front portion $10^b$. The form of this envelop is such that it can be economically cut from a strip of the kind described with very little waste, as will hereafter appear. The envelop in its simplest form is completed by folding the back portion $10^c$ over upon the front portion $10^b$, sealing the end flaps $10^e$ upon the back $10^c$, as in Fig. 72, and folding the sealing flap $10^d$ over upon the front $10^b$, as in Fig. 71. The envelop may be made either as a plain envelop as above described, or the front $10^b$ may be provided with an opening or window $10^f$ as preferred, and this window where it is employed is preferably covered on the inside of the envelop with a strip of transparent paper or fabric 11, which is gummed or pasted to the portions of the front $10^b$ surrounding the opening $10^f$, and the continuous portions of the end flaps $10^e$ so that in folding and forming the envelop the end portions of the transparent strip 11 are folded over upon the back $10^c$ and sealed down upon the same, thus strongly securing the transparent paper at its ends. The front $10^b$ is also preferably provided with a punched aperture $10^g$ in such position that when the sealing flap $10^d$ is sealed the gummed portion thereof will seal through said aperture onto the inclosed letter which will bear an address in such position as to be viewed through the transparent material covering the window, thus preventing any shifting of the inclosure and also holding the inclosure close to the transparent paper, and thus making it easier to read the address through the same. The back $10^c$ is also provided with a punched aperture $10^h$ for the insertion of a letter opener, knife, or other pointed instrument to facilitate opening the envelop. A distinctive feature of my machine besides is the fact that where the transparent material is used over the window opening, the said material is fed from a roller 11ª and is preferably firmly gummed or pasted to the paper strip forming the body of the envelop before the folding of said strip or the severing thereof into the individual envelops. I do not however, limit myself to this arrangement, but desire to cover broadly the application of the continuous transparent material to the envelop blank strip so that it extends continuously from one envelop blank portion to another and also the application of said continuous strip to the envelop blank strip and the subsequent severing of the transparent strip and envelop blank strip.

In the machine herein shown and described I have also provided printing mechanism for printing the envelop in one or more colors, by means of suitable platen presses arranged along the travel of the paper strip forming the body of the envelop, and which I term the "envelop blank strip" and while I prefer to construct the machine with this printing mechanism, I wish it to be understood that this is not essential and that the printing mechanism may be omitted if desired, without departing from my invention.

The paper roll 10ª supplying the envelop blank strip is preferably mounted upon a central core 12 provided with trunnions engaging bearings 13, in the main frame or suitable brackets projecting therefrom, at the end thereof farthest from the delivery end and the paper strip 10 is led from the roll to an initial feed or drawing off roll 14, preferably made in two or more sections, said feed roll having its periphery equal to twice the transverse width of the envelop, including the end flaps 10ᵉ, or in other words, equal to the width of two envelop blanks. Above the feed roll 14 is a pressure roll 15 also made in two or more sections, said pressure roll being mounted in spring pressed movable bearings 15ª and being adjustable out of operative position by means of a rock shaft 16 provided with an operating handle and with eccentric portions connected by links 17 to the bearings for the pressure roll shaft (see Figs. 6 and 7). The pressure roll is preferably covered with rubber or other yielding material. The feed roll 14 is driven by means of a sprocket wheel 18 and sprocket chain 19 from a sprocket wheel 20 on a countershaft 21 connected by miter gears 22—23 with the driving shaft 2 (see Fig. 8), the gearing being such that feed roller 14 is caused to make one revolution for each two revolutions of the driving shaft. The feed roll and pressure roll are connected by gears 14ᵇ—14ᶜ Fig. 8. The gearing throughout the machine is such that one complete envelop is made at each revolution of the driving shaft and the feed or drawing off roller is rotated one half revolution during the same time, a sufficient amount of paper for one envelop is positively withdrawn from the roll, thus making a positive drive which feeds the exact amount of paper needed. The roll of paper is provided with a brake or tension device of any desired kind. In Figs. 9 and 10 I have shown said device as comprising a pair of friction jaws 24—24 pivotally mounted upon a screw 25 passing through a threaded aperture in one of the supporting brackets of the frame, adjacent to the bearing 13 and clamped by means of an adjustment screw 26 and wing-nut upon a friction collar 27 secured to the roll core.

From the feed roll 14 the paper is allowed to form a loop 10ˣ and is then carried to the segmental paper guide 28 having a smooth curved surface and lateral guides 29, and carried by one of the platens of the printing mechanism, and above said guide, I provide a tension device shown in detail in Fig. 15 comprising a rocking frame 30 carrying a plurality of tension bars 31, three bars being shown, over and between which the strip 10 passes. The paper guide and tension bars are carried in a frame which is pivoted on the axis of the central tension bar and the parts are held in position by wing nuts on the end of the center bar so that by rocking said frame to different positions, the tension may be varied. The paper guide 28 is also pivotally mounted in said frame and held in position by thumb screws so that it also may be adjusted with respect to the frame. The said paper guide and tension device keep the paper taut from a point previous to its passage through the printing mechanism and up to the time when the envelop blank strip is severed into the individual envelop. From the tension device the paper passes over an idle roll 32 after which it passes horizontally between the type beds and impression surfaces of the printing mechanism which is of the platen press type, thence around idle rolls 33—33ª carried by a vertically movable platen of the printing mechanism, thence horizontally over a supporting plate 34 which prevents its sagging, and during its passage over which permits the ink to become dry. The strip 10 thence passes around roller 35 also carried by one of the platens of the printing mechanism from which the paper strip passes upwardly over an impression roller 36, adjacent to the main gumming mechanism, after which it passes horizontally over the upper surface of the machine past the various mechanisms for dieing out the window apertures, applying the transparent strip, the mechanism for partially blanking the strip and perforating or punching the same; the first folding mechanism, to the cutting off mechanism and the final folding and delivering mechanism, all of which will be hereinafter fully described.

In carrying out the various operations of the machine, the paper is fed intermittently the length of one blank or envelop during one half the revolution of the main driving shaft 2 and is operated upon by all of the various instrumentalities with which the machine is provided, while stationary, during the other half revolution. In feeding the paper from a roll the resistance to its unwinding varies with the diminution of the diameter of the roll, and in order that the feed of the paper strip may be entirely independent of and unaffected by the resistance of the roll, I employ the feed or drawing off roll operating continuously as before stated to withdraw the paper from the roll and by forming the loop 10× which accommodates the intermediate movement of the paper, I am enabled to feed the paper strip through the machine entirely independent of the resistance of the roll to its forward movement. The paper guide 28 and tension bars 31 smooth out all wrinkles in the paper and guide it laterally, and the tension or resistance to the longitudinal movement of the envelop blank strip may therefore be adjusted as desired and will thereafter remain constant. In order to hold the paper taut during the vertical movement of the platens of the printing mechanism which carry the paper up and down with them, I provide a looper or take-up consisting of a roller 37 supported in a horizontal frame 38 mounted in guides so as to slide horizontally and provided with friction rollers 39 for engaging the plate cams 40 which move said frame and roller inward when the platens rise, thus holding the paper taut in all positions of the platens.

I also provide for positively moving the envelop blank strip at various points throughout its length by what I term impellers or impelling mechanism which are timed with and operated from the main driving shaft so that the perfect registration of the said strip with all the instrumentalities of the machine is secured and all danger of the formation of wrinkles therein during its passage through the machine is avoided. In the present instance I have provided means for positively driving the impression roller 36 before referred to and have located one of the aforesaid impelling mechanisms adjacent to the mechanism for cutting out the window and another of said impelling mechanisms adjacent to the final folding mechanism. These devices will be more conveniently described in connection with the parts of the machine adjacent thereto.

It will thus be seen that for feeding the envelop blank strip I provide an initial feeding mechanism or drawing off mechanism heretofore described, for withdrawing the paper continuously from the roll, and impelling mechanisms engaging the strip at separated points and operable simultaneously during one half the revolution of the driving shaft for feeding the strip against the tension of suitable tension devices, and maintaining registration, a loop being formed between the drawing off mechanism and the tension device so that the impelling mechanisms are freed from the restraining influence of the roll and operate at all times under constant conditions. I will now describe the mechanism herein shown for imparting movement to the impelling mechanisms. The driving shaft 2 is provided with an eccentric cam 2ª (see Fig. 8) which actuates a vertically movable bar 41 mounted on suitable guides in a frame and connected at its lower end by links 42 to a pivoted arm 43 provided with a friction roll engaging said cam 2ª. It will thus be seen that during one half the revolution of the driving shaft the rod 41 will be raised and during the other half revolution it will be permitted to descend. Connected to the rod 41 near its upper end is a rack bar 44 which engages a pinion 45 loosely mounted on a shaft 46 and carrying a spring pawl 47 for engaging a ratchet 48 rigidly secured to the said shaft. This ratchet has two notches for engaging said pawl, and located diametrically opposite each other, the result being that the upward movement of the rod 41 and rack bar 44 actuate shaft 46 through one half revolution and on the descent of the rack bar the pinion 45 rotates rearwardly with respect to the shaft until the pawl engages the opposite notch. 44ª is a roller for holding the rack bar 44 in engagement with pinion 45.

Adjacent to this portion of the mechanism is located the main gumming mechanism, which is duplex in character for the purpose of enabling it to apply gum to that portion of the envelop blank strip which is to form the sealing flap of the envelop and also to separately apply gum to the portions of the strip which are to receive the transparent paper. Obviously the best results can be secured by using different gum or paste for these two purposes, the gum for the sealing flap being a pure gum and tasteless, while the gum for the transparent fabric must be of such character as to firmly unite the transparent paper to the blank. This transparent paper as ordinarily used in the manufacture of envelops, has a surface to which ordinary forms of paste or gum do not readily adhere and I therefore employ a specially prepared gum which attacks the surface of the transparent paper, and causes it to firmly adhere to the blank. The gumming mechanism consists of a detachable unit, as hereinafter described, which can be removed from the machine bodily when desired and it comprises a pair of side frames 50 adapted to be adjustably secured to brackets extending outwardly from the main frame and supporting between them the gum box or receptacle 51 which is provided with two compartments 51$^a$ and 51$^b$, the former containing the gum for the transparent paper and the latter the gum for the sealing flap. Mounted in the side frames 50 is a shaft 52 which carries the gumming rolls 53 and 54 both of which are provided with peripheries equal to twice the length of the envelop blank. The roll 53 is provided on its periphery with a die 53$^c$ which may be formed of rubber or other suitable material having two apertures 53$^d$ designed to coincide with the portions of the strip which are cut out in the formation of the windows, the gumming roll being so constructed as to apply gum to the strip longitudinally thereof, to a width equal to that of the transparent strip hereinafter referred to, but depositing no gum upon those portions of the strip which are to be cut out to form the windows, thus avoiding the fouling of the cutting die. The gumming roll 54 is provided with two raised gum applying surfaces 54$^c$ each corresponding to the portion of the sealing flap which is to be gummed and so located that the gum will be applied thereby in proper registration on the envelop blank strip. Adjacent to the respective gumming rolls 53 and 54 are feed rolls 53$^a$ and 54$^a$ respectively, mounted on the shaft 55 and extending below the surface of the gum in which they run continuously. Adjacent to the feed rollers is located a shaft 56 mounted in horizontally movable bearings and carrying wiper rollers 53$^b$ and 54$^b$, said shaft being adjustable toward and from the feed rollers by means of set screws 56$^a$. The distance between the wiper rolls and feed rolls will control the thickness of the coating of gum on the feed rollers and consequently the supplying thereof to the gumming rolls, the raised portions of which run in contact with the feed rollers. I provide means for driving all of the parts of the gumming mechanism and in this instance I have shown the shaft 52 provided with wide gear wheel 57 which engages a gear 46$^a$ on the shaft 46, thus driving the gumming rollers whenever said shaft 46 is actuated. The gear 57 engages a gear 57$^a$ on the shaft 55 of the feed rollers, imparting motion thereto and the wiper rolls are also driven by pinion 57$^b$, meshing with gear 57$^a$. The gumming mechanism is so supported that the gum applying rollers will be in proper relation to the impression roller 36 and in order that the exact contact pressure may be secured, I prefer to mount shaft 52 carrying the gumming rollers in horizontal adjustable bearings provided with adjustment screws 58 by which said shaft and gumming rolls may be accurately adjusted with respect to the impression roller. The impression roller is also positively driven so that the gumming mechanism not only does not retard the progress of the envelop blank strip, but feeds the same at the desired time and at the desired speed of movement, and in the present instance I have shown the impression roll 36 provided with a pinion 36$^a$ which meshes with the wide gear wheel 57 on the gumming roll shaft, the pinion 36$^a$ being one half the size of the gear 57 so that the impression roller makes an entire revolution to each one half revolution of the gumming roll, and therefore has its periphery equal to the length of the envelop blank strip.

The envelop blank strip passes from the impression roller 36 to the unit which forms the window in the front part of the envelop and which I term the first dieing out unit. This entire unit is detachable from the frame together with its adjacent portions of the platen or top of the machine frame and it comprises the base plate 60 provided with a cutting recess or female die 61 and a vertically movable head 62 mounted in end guides 63 secured to the base plate 60 so as to slide therein and carrying the male die 64. The die members 61 and 64 are so formed as to cut or shear out the window and are so located that they will cut out the ungummed portion left by the gumming roll 53 and within the areas to which gum is applied by said roll, as clearly shown in Fig. 26. The head 62 may be operated in any desired manner from the driving shaft during that portion of its revolution when the envelop blank strip is not being fed. In the present instance the head 62 is provided with links 65 connected to arms 66$^a$ on a rock shaft 66 provided with a depending arm 66$^b$ connected to a horizontal link 67, the rear end of which is slotted and engages a pin or stud on the lower arm 68$^b$ of a bell crank lever mounted on a rock shaft 68 and provided with a horizontal arm 68$^a$ which is connected by a link 68$^c$ to a bracket 68$^d$ on the upper end of a vertical rod 69, the lower end of which is operatively connected with a cam 2$^b$ on the driving shaft 2 as shown in detail Fig. 77. This cam is so constructed as to draw down the rod 69 and actuate the cutting or punching die for the window during one half revolution of the driving shaft, while the paper is at rest.

Adjacent to the dieing out mechanism above described is located the apparatus for supporting, drawing off, and tensioning the transparent paper strip. This mechanism is preferably in the form of a unit which can be bodily removed from the machine and comprises the base plate 70 forming part of the upper platen of the machine upon which is located a pair of side frames 71 having bearings 71ª for supporting the roller 11ª which roller is mounted upon a suitable core having trunnions to engage the said bearings and provided with a brake consisting in this instance of a grooved pulley 72ª secured to the core shaft 72, which pulley is engaged by a friction cord 72ᵇ secured at one end to the adjacent side plate and provided at the other end with a weight 72ᶜ. Mounted in the said frames 71 is a drawing-off roller 73ª mounted on a shaft 73 above which is a pressure roll 74ª on a shaft 74 carried by the links 74ᵇ pivoted to a side crossbar connecting the said frames so that the weight of the pressure roll rests upon the strip 11 above the drawing-off roll 73ª and insures the necessary friction to draw the strip from the roll 11ª. The drawing off roll 73ª is positively driven in this instance by means of a chain 75 from the shaft of the drawing off roller 14 for the envelop blank strip, the chain 75 engaging a sprocket wheel 73ᵇ on the shaft 73 and sprocket wheel 14ª on the shaft of the roller 14. The drawing off roll 73ª is of the same diameter as the roll 14 and rotating at the same speed will during each half revolution feed off sufficient transparent paper for one envelop blank and is operated continuously, making one revolution to two revolutions of the main shaft. The rolls 73ª and 74ª are connected by gears 73ᶜ and 74ᶜ. The transparent strip 11 after leaving the roller 73ª, depends in the loop 11ˣ and then passes to a segmental guide 76 and thence around and between a plurality of tension rods 77 mounted in a pivoted frame 78, said frame being held in adjusted position by wing nuts as shown, on the ends of the central tension bar, and the paper guide 76 being adjustable with respect to said frame and held in position by wing nuts as shown and in the same manner as previously described with reference to paper guide 28 and tension bars 31 for the envelop blank strip. After passing through the tension bars 77 the transparent strip 11 passes over the idle roller 79 and thence passes downwardly to and is applied to the gum portion of the envelop blank strip adjacent to and over the window apertures, as shown in Figs. 19, 23, 27, and 28.

At the point of application of the transparent strip I locate one of the feeding or impelling mechanisms which serves the double function of feeding the envelop blank strip and the transparent strip forward during one half revolution of the driving shaft and simultaneously pressing the transparent strip firmly upon the gummed surface provided for it on the envelop blank strip. This impelling mechanism is clearly illustrated in Figs. 19 and 23 and comprises a lower roller shaft 80 mounted in the frame of the machine and an upper roller shaft 81 mounted in vertically movable bearings in brackets secured to the upper platen of the machine. These shafts are provided with rollers for feeding the envelop blank strip and I prefer to form these rollers of separate sections to insure an accurate feeding of the strip, the lower roller sections being indicated at 80ª and 80ᵇ and the upper roller sections being indicated at 81ª and 81ᵇ. The opposing rollers 80ª and 81ª are preferably so located as to be in line with the transparent strip and the roll sections 80ᵇ and 81ᵇ are so located as to engage the envelop blank strip between the transparent strip and the gummed sealing flap portion of the envelop blank strip, as shown in dotted lines in Fig. 28. The shaft 81 is held in its lowest position by suitable springs engaging its bearings in the manner shown in detail in Fig. 7 with respect to the shaft of the pressure roller 15 of the drawing off mechanism for the envelop blank strip and can be raised out of operative position by means of a rock shaft 82 provided with a suitable handle and having eccentric portions 82ª connected by links 82ᵇ with the bearings for the shaft 81 when it is desired to free the strips. The impeller roll shafts 80 and 81 are geared together by means of gears 80ᶜ and 81ᵗ and the lower rollers are of twice the diameter of the upper rollers and the sizes of the gears connecting their shafts are in the same proportion so that their peripheral surfaces move together. This impelling mechanism is actuated in unison with the shaft 46 which imparts motion to the gumming rollers and impression roller 36, in this instance, by means of a sprocket chain 83 passing over a sprocket wheel 84 on the shaft 80 and a sprocket wheel 85 on the shaft 46. It will be seen that by means of this impelling mechanism the envelop blank strip will be led forward at the proper time during one half revolution of the main driving shaft and that the transparent strip will be forcibly compressed between the roller sections 80ª and 81ª thereby causing the transparent strip to firmly adhere to the gummed surface of the envelop blank strip, and extend across the same continuously and over the window aperture therein. The impelling mechanism just described I term for convenience of reference the first impelling mechanism and the supports for the upper roller thereof are mounted upon a base plate 86 forming part of the upper platen of the machine so that said plate and the parts supported thereby can be bodily removed from the machine.

From the first impelling mechanism the envelop blank strip with the transparent strip applied thereto as above described, passes through what I term the blanking mechanism, associated with which is also the secondary gumming mechanism for gumming the end flaps of the envelop blank. This preliminary blanking mechanism partially blanks out the envelops by leaving certain portions of the envelop blank strip between the adjacent back flaps 10c, and in line with the meeting portions of the blanks which are to form the end flaps as indicated in Fig. 34. This mechanism also comprises a detachable unit comprising the following elements:—90 is a supporting plate forming part of the top plate or upper platen of the machine upon which is mounted a pair of vertical guides 91 supporting and guiding a vertically movable head 92 which carries the male portions 92a and 92b of the preliminary blanking dies, the female portions corresponding thereto being carried in the plate 90. These dies are formed as shown in bottom plan view Fig. 35, the main die 92a being so formed as to remove a transversely extending portion of the blank between two adjacent back flap portions 10c as shown and having a narrow angular portion 92c at one end to extend below the base of the back flap portion 10c and wider angular portions 92d at its other end with beveled corners to form the sealing flap as shown in Figs. 34 and 35. The small die 92b also cuts an angular notch at the opposite end of the blank corresponding to and having its apex transversely with the notch formed by the portion 92c of the main die. From Fig. 34 it will be obvious that the line of severance between the adjacent blanks will be a line connecting the apices of the angular notches just described. The head 92 is moved downwardly to operate the preliminary blanking dies by means of links 93 connected to arms 94 on a rock shaft 68 before referred to, which carries the bell crank lever 68a—68b so that this preliminary blanking mechanism is operated simultaneously with the operation of the window dieing out mechanism before described by vertical movement of the rod 69. The longer vertical movement is imparted to the head 92 that is imparted to the head 62 for a reason which will presently appear. It is for this reason that the horizontal link 67 is slotted where it engages the pin carried by the arm 68b. The head 92 also carries the punchers 95 and 96 which form the apertures 10g and 10h respectively in the envelop blank strip. The said head 92 also carries a gumming pad for applying gum to that portion of the envelop blank strip which is to form the adjacent folding flaps of two adjacent blanks. This pad 97 which is preferably rubber, is carried in a metal block 98 supported by guide pins 99 passing through a portion of the head 92 and provided with enlarged portions above the head, the said block being held yieldingly in depressed position by a spring 99a as shown in detail Fig. 32. This construction causes the pad 97 to engage the appropriate portion of the envelop blank strip with a yielding pressure under all conditions. It is for this reason, on account of lost motion permitted between pad 97 and head 92 that a slightly longer descending movement is needed for the head 92 than is needed for the head 62.

It is necessary to provide means for applying gum to the lower face of the gumming pad 97, and this mechanism, in the present embodiment of my invention herein shown and described, comprises the following instrumentalities which are best shown in Figs. 29 to 34 inclusive. 100 represents a small gum tank preferably supported on a bracket 101 secured to the main frame of the machine and carrying the mechanism about to be described, so that said mechanism which also comprises a unit may be removed bodily from the machine when desired. Between side plates carried by the gum tank and bracket are supported a gum supplying roll 102 and a larger gum feeding roll 103 in contact therewith, the latter having its lower portion extending into the gum tank, and a wiper roll 104 for regulating the thickness of the coating of gum taken up by the roll 103. These rollers are geared together by means of intermeshing pinions 102a, 103a, and 104 , arranged at one side of the gum tank and are positively driven by gear 105a on a short shaft 105 which is connected by means of a sprocket wheel 105b thereon and a sprocket chain 105c (see Fig. 31) with a sprocket wheel 105d on a longitudinally disposed shaft 106 hung beneath the top plate of the machine and extending to the rear end thereof where it is provided with a driving sprocket 106a connected by a chain 106b with a sprocket 2c on the driving shaft 2 which rotates the shaft 106 at one half the speed of the driving shaft. It will be seen that the gumming roller 102 will be supplied with a coating of gum by the feeding roller 103 and provide a transfer roller movable transversely of the machine for taking the gum from the roller 102 and applying it to the lower face of the pad 97 when the latter is in its raised position, as indicated in Figs. 31 and 34. One of the side plates carried by the bracket 101 and gum box 100 is provided with an extension 107 grooved to serve as a horizontal guide for a slide bar 108 carrying on its end a transfer roll 109, said transfer roll being located in line with the bottom of the gum pad 97 as indicated in dotted lines in Fig. 34 and the slide 108 being located so as to clear the vertically movable head 92. This slide is reciprocated at the proper time by means of a bell crank lever mounted on a pivot 110 secured to the bracket 101 (see Fig. 31) and having an upwardly extending arm 110a provided with a slot engaging a stud on said slide bar and a horizontally disposed arm 110b which is pivotally connected to a vertical draw bar 111, the lower end of which is connected to a lever 112 carrying a friction roll engaging a cam $2^d$ on the driving shaft 2. This cam is so placed that during the half revolution the envelop strip is being fed and while the head 92 is consequently in raised position, the rod 111 will be drawn down as shown in Fig. 31, thereby forcing inward the transfer roll 109 across the face of the pad 97, when said rod 111 will rise and restore the transfer roll to its normal position in contact with the gumming roll 102, in contact with which it rotates during the other half revolution of the driving shaft so as to receive a fresh coating of gum after each reciprocation of the slide bar 108.

Beyond the preliminary blanking and secondary gumming mechanism just described is arranged mechanism for folding the semi-detached portion of the envelop blank strip which forms the back flap and sealing flap over upon the portion of the strip between the transverse gummed portions, which forms the front of the envelop, this fold being effected on a line approximately central of and longitudinal of the blank. This mechanism I term for convenience the first folding mechanism. This mechanism is also in the form of a unit and is supported upon a plate 115 forming part of the top plate or upper platen of the machine, and comprises the following instrumentalities:—On top of the plate 115 is mounted a pivoted plate 116 which I term the folding guide plate. This plate is pivoted on a rock shaft 117 located at one side of the path of the envelop blank and the rear edge of said plate is located exactly at the line of desired fold, said plate having a length substantially equal to the length of the front flap of the envelop between the gummed portions as shown in Fig. 41. This plate extends above and out of contact with the envelop blank strip except at the extreme inner or folding edge, which edge is beveled preferably on its upper face and rests upon the envelop blank strip, being held thereupon firmly by means of a spring 118 engaging an arm secured to the rock shaft 117 as shown in Fig. 36. The line of contact between said plate and the strip is just beyond the line on the gummed end flap portions so that the gum is not touched by said plate as the forward movement of the strip brings the partial blank envelop successively beneath it.

Located transversely of the machine from the folding edge of said plate is an aperture in the plate 115 as long as and nearly as wide as the semi-detached portion of the envelop blank strip and in this aperture is located a vertically movable plunger 119 provided with guiding studs $119^a$ engaging guiding apertures in a horizontal slide 120 mounted in guides $120^a$ secured to the bottom of the plate 115 so that said plate 119 is capable of both vertical movements within said aperture and of a horizontal movement when raised out of said aperture in the latter of which it moves with the slide 120. The edge of the plate 119 nearest the folding edge of the plate 116 is beveled on its lower side opposite the bevel of the latter plate as shown in Fig. 40. Vertical movement is imparted to the plate 119 by means of a cam 121 on the longitudinal shaft 106 operating on a friction roll $121^a$ on one end of a lever $121^b$ pivoted to the under side of the plate 115 and having its rear end engaging a roller $119^b$ connected with the plate 119. Back and forth movement transversely of the machine is imparted to said plate 119 by means of a cam 122 on the shaft 106 acting upon a friction roller $122^a$ carried by a horizontal slide bar $122^b$ connected to the slide 120, as shown in Figs. 37, 40, and 42, and a spring (not shown) acting on the bar $122^b$ for holding the roller in engagement with the cam. Supposing the parts to be in position shown in Fig. 41 with the plate 116 above the front flap of the envelop blank, the plunger plate 119 is first raised thereby elevating the semi-detached portion of the envelop and making a slight crease adjacent to the line of engagement of the plate 116 therewith (see Fig. 40), the forward movement of the plate 119 follows, thus folding down the semi-detached portion of the blank and the plunger plate 119 is then moved downwardly while in its advanced position so as to crease the blank at the line of fold.

The plunger 119 is then again released by the cam 121 and the cam 122 immediately restores said plunger to its original position in line with the aperture in the plate 115 when the cam 121 causes the plunger to be lowered into its normal position. The foregoing movements take place during less than one half revolution of the main driving shaft 2 and the envelop blank strip is thereafter acted upon by the creasing mechanism hereinafter described.

This creasing mechanism comprises a horizontally disposed swinging arm 123 pivoted on a sleeve 124 and carrying a creasing plate 125 connected thereto by guide studs $125^a$ engaging guiding apertures in the arm 123, said creasing plate being held in its lowest position by springs $125^b$ (see Fig. 36). The sleeve 124 is carried on a vertical stud 126 having a shoulder below said sleeve and the lower end of the sleeve is provided with a pinion 127. The lower end of the stud is connected to a rocking lever 128, the other end of which carries a friction roller which engages a cam 129 on the shaft 106 and the pinion 127 is in engagement with a rockbar 130 provided with a friction roller which engages a cam 131 on the shaft 106, suitable springs (not shown) being employed to maintain the rocking lever 128 and the rock bar 130 in proper relation with their respective cams.

After the semi-detached portion of the envelop has been folded as previously described and the plunger has returned to its normal position, the creasing mechanism will be actuated, being first raised by the cam 129 and then swung over into the position indicated in dotted lines in Fig. 38 by the cam 131 above the line of fold, when the creasing arm will be lowered by its cam 129, and the creasing plate 125 will be caused to bear yieldingly on the folded portion of the blank immediately above the fold, thus firmly creasing the blank. The creasing plate which is slightly upturned at its outer end, will remain in the position shown in dotted lines in Fig. 38 during the next forward movement of the envelop blank strip so that as the folded portion of the envelop immediately beneath it is drawn forward, it will be still more firmly creased and the semi-detached portion will be prevented from rising. The creasing plate will then be again raised and swung back into its normal position.

The partly folded envelop blank strip then passes to an impelling mechanism which I term the second impeller, and which actuates the partially folded strip simultaneously with and to the same extent as it is actuated by the first impelling mechanism, and the impression roller 36. It will be understood that the gum which has been applied to the sealing flap has had an opportunity to dry during its passage from the main gumming mechanism. The gum which has been applied to the meeting end flap portions of the strip is however moist and this second impeller must therefore be so constructed as to bridge over these sticky surfaces. To this end I employ a pair of upper impelling rollers 140ª and 141ª carried by separate shafts 140 and 141 respectively, said rollers being located in different transverse planes with respect to the folded blank strip and engaging the strip at different points longitudinally thereof as clearly shown in Figs. 45, 50 and 53. Each of these top rollers is provided with a cutaway portion or notch 140ᶜ and 141ᶜ respectively as shown in Fig. 45, said notches being located at different points around their respective shafts and being of sufficient length to bridge over the moist gum portion between the adjacent folded semi-detached portions of the envelop blank strip. The impelling mechanism also includes two lower shafts 142 and 143 carrying the lower impeller rollers 142ª and 143ª (see Fig. 57), located below the corresponding upper rollers and clamping the folded strip between the upper and lower rollers. The upper roller shafts 140 and 141 are supported in vertically movable spring pressed bearings similar to those shown in Fig. 7 and said shafts are also engaged at each end by triangular yokes 144 which engage eccentric portions of a rock shaft 145 provided with a suitable handle for rotating the same, so that by rocking the said shaft the upper impeller rollers can be lifted out of engagement with the strip when desired. Both the top and bottom rollers of this impelling mechanism are positively driven by the same mechanism heretofore described which imparts motion to the impression roller 36, and the first impeller, and in the present instance the driving mechanism is constructed as follows, in order to insure the proper direction of rotation of the several rollers. The shafts 140 and 142 are geared together by means of pinions 140ᵇ and 142ᵇ and the shafts 141 and 143 are similarly geared by gears 141ᵇ and 143ᵇ, as shown in Fig. 44. At the opposite side of the machine the shaft 142 is provided with a pinion 142ᶜ and the shaft 143 is provided with a pinion 143ᶜ. These pinions mutually engage a broad gear 146 on the stud secured to the main frame of the machine which in turn meshes with a gear 147, also mounted on a stud secured to the main frame and said gear 147 has connected with it a sprocket wheel 148 engaged by a sprocket chain 149 which connects it with a sprocket wheel 149ª on the shaft 80 of the first impeller, thus driving the rollers of the second impeller positively and at the same speed as those of the first. It will be understood that in one complete revolution of the feed rollers of the second impeller, the folded envelop strip will be moved forward exactly the length of one envelop blank, said rollers by reason of the notches 140ᶜ and 141ᶜ passing over the gummed portions, the strip being at all times driven by at least one pair of impelling rollers. Adjacent to the second impelling mechanism are provided a knife for severing the individual blanks from the envelop blank strip, and for simultaneously clamping the severed blank, and retaining it while it is acted upon to fold the end flaps and seal the same and fold and crease the sealing flap by means of the mechanism which I term the final folding mechanism, after which the completed envelop is delivered from the machine. The knife or cutting mechanism comprises a vertically movable blade 150 preferably located above the travel of the folded strip and a stationary coacting blade 151 located below the same, said blades being disposed transversely of the strip and so located as to be exactly in line with the central part of one of the gummed end flap portions of the strip when the strip is at rest. The movable blade is carried by a bracket 152 on a vertically movable guide bar 153 and in this instance is actuated by means of a rocking lever 154 pivoted centrally to a bracket 155 secured to a vertical frame extension 1ª extending above the top plate or platen of the machine. The guide bar 153 is connected to one end of this rocking lever and the other end of said bar is connected by a link 156ª with a vertical rod 156 extending downwardly through suitable guides to the base of the frame, where it is connected to one arm 157 of a bell crank lever pivoted in a bracket at the base of the frame and having its other arm 158 provided with a friction roller bearing against a suitable cam for actuating the knife blade. It will be obvious that the various movements imparted to the several parts of the mechanism hereinafter described might be obtained by the use of a plurality of separate cams, but for simplicity of construction, I have herein provided a multiple cam provided with the necessary cam grades to effect the desired operation of said parts, which cam is shown in detail in Figs. 67 and 68 and being indicated at 160, the said cam being located on the main driving shaft 2. The grade which actuates the knife blade is indicated by 160ª and is provided with a concentric portion extending almost entirely around the shaft and with a projecting portion 160ᵇ (see Fig. 67) for imparting a quick down stroke to the knife blade and permitting its quick return in order that the folding and sealing operations may take place during the remaining portion of the half revolution of the main driving shaft. The weight of the rod 156 will restore the blade to its uppermost position and this weight may be reinforced by a suitable spring (not shown) if necessary.

The final folding mechanism together with the cutting off mechanism just described are supported upon a plate 161 forming part of the top platen of the machine upon which plate the frame extension 1ª is secured so that this mechanism also constitutes a separate unit. The plate 161 is provided with a rectangular aperture substantially the length of the envelop and of greater width transversely of the machine (see Figs. 45 and 47). Within this aperture is located a horizontally disposed envelop support which for convenience of reference I term the trap, for the reason that, as herein described, it sinks through said aperture something after the manner of a trap door. This trap, indicated at 162, is preferably rectangular and substantially the size and shape of the finished envelop and is provided at its longitudinal edge nearest the position of the sealing flap portion of the folded blank strip, with an undercut beveled portion 162ª. This trap which is shown in detail in Figs. 54 to 56 inclusive, is secured to a vertical slide 162ᵇ mounted in a guide 162ᶜ bolted to the plate 161, said guide being provided with a slot through which extends a stud 162ᵈ, which stud is carried by an arm 163 on a vertical rod 164 extending downward to the base of the machine frame through suitable guides and having its lower end connected to a lever 165 carrying a friction roller 166 which engages a cam grade 160ᶜ of the multiple cam 160 and is so constructed as to give the trap the movements hereinafter described. In its normal position, as shown in Figs. 45 and 47, the upper face of the trap is flush with the upper face of the top plate 161 so that a portion of the folded blank strip forming one envelop will be fed over said strap and into such position that only the end flap portions will project equally from opposite ends of the same. The said trap is also provided with two or more slots 167 extending transversely from the edge opposite the undercut edge, across the trap, to accommodate the knock out pins or studs of the knock out mechanism hereinafter described.

Above said trap is the clamping plunger 170 which is supported by a vertically movable shaft 171 mounted in bearings in the frame extension 1ª and having connected therewith a bracket arm 172 secured to the upper end of a vertical rod 173 passing downward through suitable guides to the lower part of the machine frame where it is connected to a lever 174 provided with a friction roller 175 engaging a cam grade 160ᵈ on the multiple cam 160 for imparting the necessary vertical movements to this plunger. The plunger 170 is provided with two bottom plates 176 having beveled ends 176ª, each projecting beyond the upper portion of the plunger, said plates lying in the same plane and having at their inner ends projecting fingers extending from each plate into recesses or open slots in the other, forming a guiding engagement between the two plates, while permitting them to move inwardly so as to retract the said beveled portions beneath the upper portion of the plunger when permitted so to do. These two plates are connected by springs 176ᵇ which normally tend to retract them (see Figs. 51, 58, and 59). These plates are provided with studs 176ᶜ projecting upward through slots in the upper part of the plunger and carrying friction rollers 176ᵈ which engage the lateral faces of a cam 177 shown in detail in Figs. 48 and 49. This cam is provided with opposite grades 177ª—177ª which in the normal position of the cam, hold the plates 176 in their extended positions, but on the rotation of the cam, permit the springs to retract said plates. This cam 177 is carried by a sleeve 178 mounted on the vertical shaft 171 which sleeve is provided on its exterior with a long pinion 178ª the teeth of which engage those of a segmental rack bar 179 mounted on a vertically supported rock shaft 180, mounted in suitable bearings in the main frame, provided at its lower end with an actuating arm 181 carrying a friction roller 182 which engages a cam grade 160ᵉ of the multiple cam 160 to partially rotate the rock shaft 180 at the proper time so as to impart the desired rotary movement to the cam 177. The engagement of the long pinion 178ᵃ with the rack bar 179 permits the proper movement to be imparted to the cam without interfering with the vertical movement of the cam with the plunger and connected parts. At opposite ends of the aperture in the plate 161 are stationary folding bars which support the end flap portions of the folded envelop blank. In the present instance the stationary knife blade 151 is carried by one of said folding bars 183, the other being indicated at 183ᵃ. Below the folding bars are located the folding rollers 184—184, shown in detail in Fig. 60, said rollers being mounted in suitable bearings on the under side of plate 161, and having portions intermediate of their ends cut out, as indicated at 184ᵃ, thereby forming flat folding faces in line with their axes. At one of their ends they are further cut away, as shown at 184ᵇ in Fig. 60, for another quarter, to accommodate the sealing flap folding mechanism hereinafter described. Each of the folding rollers 184 is provided with a beveled pinion 184ᶜ engaged by beveled pinion 185ᵃ on a longitudinally extending shaft 185 supported in bearings beneath the plate 161, said shaft being provided adjacent to one end with a pinion 185ᵇ which engages the teeth of a rack 186ᵃ (see Figs. 60 and 61) carried by a horizontal sliding bar 186 said bar carrying a friction roller 186ᵇ engaging cam 187 secured upon the longitudinal shaft 106 hereinbefore referred to, said slide bar 186 being suitably guided in its endwise movement in this instance by means of a guide engaging one end and a groove collar on said shaft engaging a yoke shaped portion at the other end of said slide. The slide is maintained with its friction roller in contact with the cam at all times by means of a suitable spring, (not shown).

The mechanism for folding and creasing the sealing flap and thus forming the complete envelop is carried by the plunger 170 and comprises the following instrumentalities. 190 is the sealing flap folding bar, which is provided with two horizontal guide rods 191 extending through guide blocks 192 which are provided with vertically disposed apertures having a sliding engagement with vertical guide pins 193 secured to and projecting upward from the plunger 170 so that the folding bar 190 is movable both vertically and horizontally with respect to the plunger, while at the same time it is movable with the plunger in the vertical movements thereof.

The bar 190 is recessed on its inner face as shown in Figs. 58 and 59, and is provided with an interior inclined or beveled edge 190ᵃ and having substantially the same inclination as the undercut edge 162ᵃ of the trap 162 hereinbefore described. The folding bar is also normally drawn toward the plunger by means of suitable springs 194, and the said folding bar is provided within a slotted portion with a horizontal friction roller 195 which engages a vertically disposed cam grade 177ᵇ on the cam 177. The folding bar is also provided with a vertically disposed friction roller 196 which engages a horizontal cam grade 177ᶜ on the cam 177 for raising and lowering the said folding bar with respect to the plunger.

I will now describe the portion of the foregoing apparatus in effecting the sealing of the end flaps and folding of the sealing flap preparatory to delivering the finished envelop from the machine. The parts being in the position shown in Figs. 45 and 47, the rotation of the main driving shaft 2, during one half revolution, having fed forward the envelop blank strip and the portion of the folded strip comprising one envelop blank having been delivered by the second impeller past the knife blades of the cutting mechanism and between the trap 162 and the bottom plates of the plunger, the plunger commences to descend and clamps the projected portion of the folded blank strip against the upper face of the trap and simultaneously the movable knife blade by a quick reciprocation severs the clamped portion of the strip as before described. The plunger 170 continues to move downwardly carrying with it the trap, the controlling cam grades for these parts 160ᶜ and 160ᵈ, causing them to descend together and at the same time clamp the severed envelop between them. The trap and plunger descend until the envelop is brought into what I term the folding plane which is in line with the axes of the folding rollers 184, when the plunger and trap stop. As the plunger and trap descend it will be seen that the projecting end flap portions of the severed envelop will engage the stationary folding bars 183 and 183ᵃ and be bent upward into a vertical position and carried downwardly against the straight folding faces 184ᵃ of the folding rollers. At this moment the rock shaft 180 is actuated by its cam grade so as to partially rotate the cam 177 thereby permitting the bottom plate sections of the plunger to be retracted by the springs and simultaneously lowering the folding bar 190 with respect to the plunger and trap. It will be seen by reference to Fig. 41 that when the semi-detached portion of the envelop blank strip is partially folded the sealing flap portion 10ᵈ will extend beyond the lateral edge of the blank strip and when the envelop is in the grip of the plunger and trap, the folding bar 190 will lie directly above the sealing flap of the envelop.
Consequently when it is lowered by the partial revolution of the cam 177 it will also bend the sealing flap downward into horizontal position and the further revolution of the cam 177 will, by reason of the cam grade 177$^b$ and friction roll 195, permit the sealing bar to be drawn inwardly toward the plunger by its springs 194 sufficiently to pinch the fold of the sealing flap between the interior inclined face 190$^a$ of the folding bar and the undercut inclined face 162$^a$ of the trap.

Simultaneously the folding rollers 184 are given a quarter turn by the operation of the cam 177 thereby folding down the end flaps of the envelop upon the back portion thereof and sealing them thereto, thus sealing in the end portions of the transparent strip 11 as before stated. The folding rollers are immediately retracted after pressing the end flaps firmly against the back of the envelop, and sealing the same, and the operation of the cam 177 is reversed to throw out and elevate the folding bar 190. As soon as the folding rollers have resumed their normal position, the plunger and trap are moved downwardly to what I term the delivery plane, below the folding rollers, the plunger coming to rest slightly before the trap, thus permitting a slight separation between the trap and plunger which releases the envelop from their clamping action. In the last descent of the trap the transverse slots 167 therein have been brought into alinement with two or more knock-out pins 200 carried by a knock-out bar 201, shown in detail in Figs. 62 and 63, said bar being secured to a horizontal slide bar 202 mounted in guides secured to the lower face of the plate 161, said slide bar being provided with friction roll 203 in engagement with a cam 204 on the shaft 106, said roller being held in engagement with the cam by a suitable spring (not shown). As soon as the trap has come to rest the cam 204 will actuate the slide bar 202, moving the knockout bar 201 and its pins forward, said pins extending upwardly through the slots 167 in the trap and engaging the rear edge of the envelop which is thus pushed off of the upper face of the trap. I prefer to deliver the envelops downwardly in succession into a trough or receptacle and to this end I provide adjacent to the position of the trap in its lowermost position a delivery roller 210 on the shaft 106 above which is located a roller 211 engaged by a series of belts 212 passing around a roller 213 which is preferably hung in adjustable bearings from the main frame of the machine, the said belts 212 passing over the periphery of the delivery roller 210, as clearly shown in Figs. 44, 47, and 57. Between said belts I preferably provide a series of guide fingers 214 to assist in deflecting the forward edge of the envelop downwardly and by these means the envelops when pushed forward by the knockout device will be gripped between the belts 212 and the delivery roller 210 and delivered vertically into a horizontal trough 215 located in proper relation therewith. This trough will be provided with the usual means for holding the envelops on edge and the mechanism may be further provided with any usual counting and numbering devices of any usual or preferred character, which devices however form no part of my present invention, and are not herein shown.

The mechanism for printing the envelop blank strip may be of any preferred type. As before stated it consists in this instance of a plurality of platen presses, two presses being herein shown, the stationary type beds of which are indicated at 220 and 221 in Fig. 1. Each of these presses is provided with a vertically movable platen of well-known construction indicated at 222 and 223 respectively which are secured to vertically movable guide bars mounted in suitable guides in the machine frame and indicated at 222$^a$ and 223$^a$ said platens being reciprocated vertically by means of cranks 224—224 and 225—225 on the main driving shaft 2, as shown in dotted lines in Fig. 1. The platen 222 carries brackets 222$^b$ (see Fig. 11) forming the supports for the paper guide 28; tension rollers 31, and their supporting frame, the idle rollers 32 and 35, and the plate cams 40 hereinbefore described. The platen 223 carries the idle rollers 33 and 33$^a$ and for convenience of adjustment and to secure the perfect set of the envelop blank strip and proper registration of the printing devices, I conveniently mount the said rolls 33 and 33$^a$ on a swivel frame 33$^b$ carried by horizontally adjustable yokes 33$^c$ each provided with a threaded stem 33$^d$ passing through a lug on the back of the type bed and provided with suitable adjusting and set nuts. It will be seen that by means of one or both of these presses the envelops can be printed at their proper points as the strip is fed from the tension device between the type bed and platens, the paper being carried by the platens and moved therewith toward and from the type beds. It will also be seen that the printed slip after leaving the last type bed is carried over the supporting plate 34 and given an opportunity to dry before reaching the main gumming apparatus. It will also be obvious that the presses need not be operated where blank envelops are to be formed, in which case the presses may be simply thrown out of operation by means of the usual impression-throw-off mechanism with which they, in common with all platen presses, are provided, one of said devices being indicated at 226, Fig. 16. Obviously the printing mechanism may be dispensed with entirely if desired.

Having now described the various parts of my improved machine, the operation thereof in the formation of envelops will be readily understood especially by reference to Fig. 69, in which the envelop blank strip and the transparent paper strip are shown diagrammatically and the various operations performed thereon are indicated. Thus it will be understood that the envelop blank strip is drawn off continuously from the paper roll 10ᵃ by the drawing off or feed mechanism previously described, forming a loop of slack 10ˣ before passing to the paper guide and tension bars which smooth out the paper and place the desired amount of friction thereon against which the paper is drawn forward by the combined and simultaneous action of the gumming mechanism, the first impeller and the second impeller which are simultaneously actuated during one half revolution of the driving shaft by means of the vertical rock bar 44, pinion 45, and the ratchet and pawl connection with the pinion shaft 46. From the tension device the paper passes across the platens of the printing mechanisms where it is printed if desired in one or more colors, returning over the supporting plate carried by said platens to permit the ink to dry, after which it passes to the main gumming mechanism, the strip being maintained taut in all positions of the platens by means of the horizontally movable looper roll 37 actuated by the plate cams 40, as before described. It will also be understood that as the paper remains stationary for one half revolution of the main driving shaft and as the feed or drawing off mechanism operates continuously, the loop 10ˣ of slack paper will be alternately shortened and lengthened during the operation of the machine.

The first gumming mechanism which is actuated during the half revolution of the driving shaft which effects the forward movement of the envelop blank strip, by means of the die roller 53, before described, applies a continuous band of adhesive to those portions of the envelop blank strip which are to receive the transparent paper, except the separated clear portions corresponding to the window apertures, and which are not gummed. Simultaneously the other gumming die roller 54 applies suitable adhesive at intervals to those portions of the blank strip which are to form the sealing flaps 10ᵈ of the envelops. After leaving the gumming mechanism the envelop blank strip passes beneath the first dieing out mechanism which cuts out the ungummed portion within the confines of the gummed strip, thus forming the window openings and leaving the strip in condition to receive the transparent paper.

The transparent paper is continuously withdrawn from its roller 11ᵃ, a loop of slack 11ˣ being formed therein to accommodate the intermittent feeding of this strip with the envelop blank strip and also to relieve the transparent strip from the resistance of the roller in unwinding. The transparent strip then passes over its paper guide and tension device and thence downwardly to the envelop blank strip in line with the gummed and perforated portion thereof, upon which it is pressed and firmly sealed by the upper roller of the first impelling mechanism.

The transparent strip having been firmly applied and sealed to the envelop blank strip the combined strips pass to the preliminary blanking and second gumming mechanisms, which as before described, simultaneously remove portions of the blank and apply a coating of gum upon the portions of the envelop blank strip and transparent strip which form the meeting end flap portions between adjacent blanks.

The combined strips then pass to the first folding mechanism which as before described, folds the semi-detached portion of the envelop blank strip over upon the transparent paper strip and the remaining portion of the envelop blank strip and between adjacent gummed end flap portions, the gum on the sealing flap having had an opportunity to dry in the meantime, so that it is not adhesive when this fold is made. The folded blank strip then passes to the second impeller which feeds it to the cutting and final folding mechanism, the upper rollers being cut away as before described to avoid contact with the freshly gummed end flap portions over which they must pass. The individual envelops then severed for the first time from the strip and by means of the mechanism herein before fully described, the severed envelops firmly gripped between the plunger and trap of the final folding mechanism, the end flaps are folded over and sealed upon the back of the envelop, the sealing flap is folded downwardly and creased, and the envelop is then released and positively delivered from the machine.

It will also be understood that the operations of printing, dieing out the window, partially blanking the envelop, and applying gum to the end flap portions, the first folding operation, and the cutting off and final folding of the finished envelop, occur during the half revolution of the machine, while the envelop blank strip is stationary, and that the operation of the first gumming mechanism, the applying of the transparent strip, and the creasing of the fold take place during the half revolution of the driving shaft, while the envelop blank strip is being moved forward the length of one envelop by the impelling mechanisms previously described.

In Figs. 73 to 76 inclusive, I have illustrated a slight modification of my improved machine by means of which a plurality of perforations disposed in a line transversely of the machine are made in those portions of the transparent strip which are gummed to the end flap portions of the envelop blank strip as shown at 11$^b$ in Figs. 74, 75, and 76. The other portions of the envelop being lettered to correspond with Fig. 70, to avoid confusion, as they are identical with the parts therein shown. These provisions may be made in any desired way. In Fig. 73 I have shown one form of mechanism for accomplishing this result in which the frame which supports the transparent paper roll and the mechanism for withdrawing, guiding, and tensioning the same, is provided with an additional roller 79$^a$ for deflecting the strip 11 and in conjunction with the upper roller 81$^a$ I employ a punching roller 81$^d$ provided with punches (81$^e$) disposed in rows transversely across the machine and so located as to punch the transparent strip in the portions which are applied to the end flap portions of the envelop blank strip, as will be readily understood. All the other parts shown in Fig. 73 are identical with the parts of the machine previously described and shown, for example in Fig. 27.

In this modification it will be obvious that when the gun is applied to the end flap portions as shown at the shaded portions 11$^g$, in Fig. 74, the apertures 11$^b$ will receive minute quantities of gum which will be retained therein and when the end flaps are folded after the blank is severed, the end flaps 10$^e$ will be sealed through the apertures 11$^b$ upon the face of the back flap 10$^e$ of the envelop, as shown in Figs. 75 and 76, thus more securely locking the end flaps to the back of the envelop and at the same time interlocking the end portions of the transparent strip therewith. One of the objectionable features of envelops having window apertures and coverings of transparent fabric therefor, is the tendency of the transparent fabric to cleave from the body of the envelop and become detached so that the contents of the envelop may be tampered with. This difficulty I guard against by employing a specially active glue which will make the surface of the transparent paper adhere to the envelop blank strip, and further, by interfolding the ends of the transparent paper with the end flaps of the envelop and thus preventing the transparent paper from starting to cleave away from the body of the envelop at either end, and this effect is very much intensified by the interlocking apertures 11$^b$ which both lock the ends of the transparent paper and tend to more securely unite the end flaps to the body of the envelop.

The machine herein illustrated and described may be provided with any desired stopping and starting mechanism, and in the present instance I have shown the actuating shaft 5 provided with a friction clutch 230 for connecting the driving wheel 6 therewith and disconnecting it therefrom, said clutch being controlled by hand lever 231 (see Figs. 1 and 2).

I do not desire to be limited to the exact details of construction herein shown and described, as variations may be made therein without departing from my invention.

What I claim and desire to secure by Letters Patent is:—

1. In an envelop machine, the combination with means for supporting an envelop blank, said blank being provided with window apertures therein spaced to provide an aperture for each envelop blank after the same has been cut off, of means for adhesively applying a continuous transparent strip of less width than the said blank, to said blank over the window apertures therein, means for severing said transparent strip, means for operating upon a lateral portion of the blank not covered by said transparent strip to fold it over upon the portion adhesively engaged by said transparent strip and end flap folding mechanism.

2. In an envelop machine, the combination with means for supporting a continuous envelop blank strip, said strip being provided with window apertures therein spaced to provide an aperture for each envelop blank after the same has been cut off, of means for adhesively applying a continuous transparent strip of less width than said blank strip to said blank strip over the window apertures therein, mechanism for blanking and severing individual envelop blanks from said blank strip, and severing the transparent strip, mechanism for folding a portion of the blank strip not covered by the transparent strip upon the portion adhesively engaged by said transparent strip, and end flap folding mechanism.

3. In an envelop machine, the combination with means for supporting and feeding a continuous envelop blank strip, cutting mechanism for forming window apertures therein at spaced intervals to provide an aperture for each envelop blank after the same has been cut off, means for adhesively applying a continuous transparent strip of less width than said blank strip, to said blank strip over the window apertures therein, cutting mechanism for cutting out portions of the blank strip not covered by said transparent strip to blank individual envelops, and means for severing individual envelop blanks from said blank strip.

4. In an envelop machine, the combination with means for supporting and feeding a continuous envelop blank strip, cutting mechanism for forming window apertures therein, means for feeding a continuous transparent strip of less width than said blank strip, and adhesively applying it to said blank strip over the window apertures therein, mechanism for cutting out transverse portions of the blank strip laterally of the transparent strip, and mechanism for folding a portion of the envelop blank strip between said cut out portions not covered by the transparent strip, upon the portion of the envelop blank strip covered by the transparent strip, and means for severing the envelop blank strip into individual envelop blanks.

5. In an envelop machine, the combination with means for supporting and feeding a continuous envelop blank strip, cutting mechanism for forming window apertures therein, means for feeding and applying a strip of transparent material of less width than the blank strip to said blank strip over a window aperture therein, cutting mechanism for cutting out lateral portions of the blank strip to partially blank the envelop and define the end flaps and sealing flap, folding mechanism for folding a portion of the blank strip between said cut out portions over upon the portion covered by said transparent strip, mechanism for severing the individual blanks from the blank strip, and mechanism for folding the end flaps and sealing flap.

6. In an envelop machine, the combination with means for supporting an envelop blank, said blank being provided with a window aperture and portions adjacent to opposite ends of said aperture, adapted to form the end sealing flaps of the envelop, of means for advancing and simultaneously applying a transparent strip from one end to the other of said envelop blank over the aperture therein and upon said end flap portions, means for gumming the end flap portions of the envelop blank and the portions of said transparent strip thereon, and folding devices including means for folding said end flaps, whereby the end portions of said transparent strip are interfolded with the end flaps of the blank.

7. In an envelop machine, the combination with means for supporting and advancing a continuous envelop blank strip, provided with window apertures at intervals, of means for advancing and simultaneously applying a continuous transparent strip to said blank strip over the successive apertures and upon the portions of the envelop blank strip which are to form the end flaps of the envelop, means for partially blanking the said blank strip to form the end flaps, means for gumming the end flap portions of said blank strip, means for severing said envelop blank strip and said transparent strip simultaneously to separate the individual envelop blanks, and folding means including means for folding and sealing the end flaps, whereby the end portions of said transparent strip are interfolded with the end flap portions of the blank.

8. In an envelop machine, the combination with means for supporting an envelop blank, said blank being provided with a window aperture and portions adjacent to opposite ends of said aperture adapted to form end sealing flaps, of means for applying a transparent strip to the envelop blank over the aperture and upon the said end flap forming portions, whereby when the end flap portions are folded and sealed, the end portions of said transparent strip are interfolded with said end flap portions.

9. In an envelop machine, the combination with means for supporting and advancing a continuous envelop blank strip, means forming window apertures at intervals therein, and means for applying gum to said blank around and between said window apertures and upon the end flap forming portions of said blank strip, of means for advancing a continuous transparent strip and simultaneously applying it to the gummed portions of the envelop blank strip, and means for simultaneously severing said envelop blank strip and said transparent strip between adjacent envelop blanks whereby when the blank is folded, portions of the transparent strip will be interfolded with the end flaps of the envelop.

10. In an envelop machine, the combination with means for supporting a continuous envelop blank strip, and means for advancing said strip, of means for applying gum to said blank strip in a band extending longitudinally thereof, said gumming means being provided with cutaway portions of approximately the desired size of the window apertures, means for cutting out the ungummed portions of the blank strip within said gummed band to form the window apertures, means for advancing a transparent strip and simultaneously applying it to said gummed portions of the envelop blank strip over said window apertures, and means for simultaneously severing said blank strip and transparent strip to separate individual envelop blanks.

11. In an envelop machine, the combination with means for supporting an envelop blank strip, and means for advancing said strip, of means for cutting out portions of said strip extending part way across the same to form semi-detached portions, while not completely severing the strip, means for gumming transverse portions of the strip in line with said cut out portions, means for folding said semi-detached portions over upon the integral portions of the envelop blank strip, means for severing the integral portions of the strip centrally through the transverse gummed portions thereof, and folding means for folding said transverse gummed portions of each envelop blank strip and sealing the same upon said semi-detached portion.

12. In an envelop machine, the combination with means for supporting a continuous envelop blank strip, and means for advancing said strip, of cutting mechanism for removing transversely disposed portions of the strip without completely severing the strip, gumming mechanism for applying gum to transverse portions of the strip in line with said cutaway portions, means for folding the semi-detached portions of said blank strip between said cutaway portions over upon the integral portions of the strip forming a fold extending longitudinally of the strip, the portion of said strip on one side of said line of fold being provided with a sealing flap portion projecting beyond the other portion of the strip, means for severing said strip transversely, centrally through said gummed portions, means for folding the gummed portions at opposite ends of the detached envelop blank and sealing the same upon said semi-detached portion of the blank, and means for folding and creasing the sealing flap.

13. In an envelop machine, the combination with means for supporting a continuous envelop blank strip, and means for advancing said strip, of gumming mechanism for applying gum at intervals to the sealing flap portions of said strip adjacent to one edge of the same, cutting mechanism for removing transversely extending portions of the strip and shaping the end portions of the sealing flaps without severing the strip, gumming mechanism for applying gum to the strip in line with said cutaway portions, means for folding the semi-detached portions of the strip, between said cutaway portions, longitudinally of the strip, upon the integral portions thereof, said semi-detached portions being of greater width than the integral portions, thus carrying the gummed sealing flap portion beyond the edge of the integral portion, means for severing the strip transversely, centrally through said transversely gummed portions, folding mechanism for folding and sealing the end flaps upon said semi-detached portions, and means for folding and creasing the envelop sealing flap.

14. In an envelop machine, the combination with means for supporting an envelop blank strip, and means for advancing the same, cutting mechanism for forming window apertures in said strip, and gumming mechanism for applying gum to portions of the strip around said window apertures, of means for advancing and simultaneously applying a transparent strip to said gummed portions, means for cutting out transverse portions of the envelop blank strip without severing the strip, means for gumming transverse portions of the strip in line with said cut-out portions, means for folding the semi-detached portions of the strip between said cut-out portions, upon the integral portions of the strip, means for severing said strip centrally of said transverse gummed portions, and folding mechanism for folding and sealing the transverse gummed portions at each end of the envelop blank upon the said semi-detached portion thereof.

15. In an envelop machine, the combination with means for supporting an envelop blank strip, and means for advancing the same, of cutting mechanism for forming window apertures therein, gumming mechanism for applying a continuous band of gum around and between said window apertures, means for advancing and simultaneously applying a continuous transparent strip to said gummed portion of the envelop blank strip, cutting mechanism for removing transversely disposed portions of the strip adjacent to one edge of the same without severing the strip, means for gumming transversely disposed portions of both strips in line with said cut-out portions, means for folding the semi-detached portions of the blank strip between said cut-out portions over upon the integral portion of the blank strip, means for severing the integral portion of said strip and said transparent strip centrally of said transverse gummed portions, and folding mechanism for folding the transverse gummed portions at each end of the severed envelop blank over upon the said semi-detached portion thereof, whereby the end portions of said transparent strip are interfolded with the end flap portions of the envelop blank strip.

16. In an envelop machine, the combination with means for supporting a continuous envelop blank strip, and means for advancing said strip, of gumming mechanism comprising a gumming roll having cutaway portions substantially corresponding to the size and form of a window aperture for applying a continuous band of gum inclosing ungummed portions and a gumming roll provided with a gum applying portion for applying gum at intervals to the sealing flap portions of the said strip, adjacent to one edge of the same, cutting mechanism for removing said ungummed portion within the gummed band to form window apertures, means for advancing a continuous transparent strip and simultaneously applying it to said gummed band over said window apertures, means for cutting out transversely disposed portions of said blank strip adjacent to one edge thereof without severing the same, means for gumming transverse portions of the blank strip and transparent strip in line with said cut-out portions, folding mechanism for folding the semi-detached portions of the envelop blank strip between said cut-out portions, over upon the integral portions of said strip, means for severing the envelop blank strip and transparent strip simultaneously centrally of said transverse gummed portions, and folding mechanism for folding the transverse gummed portions at each end of the envelop blank strip and sealing the same upon the said semi-detached portion thereof.

17. In an envelop machine, the combination with means for supporting a continuous envelop blank strip, and means for advancing said strip, of gumming mechanism comprising a gumming die roll for applying gum to the sealing flap portions of said strip, and a separate gumming die roll having cutaway portions corresponding to window apertures for applying gum longitudinally of said strip, separate gum receptacles for said die rolls, and means adjacent to each of said die rolls for supplying gum thereto from one of said receptacles, cutting dies for cutting out ungummed portions of said strip to form window apertures, means for advancing and applying a continuous transparent strip to the gummed portions of said envelop blank strip in line with said window apertures, mechanism for partially blanking said strip without severing the same and for applying gum to transverse portions thereof, mechanism for severing said blank strip centrally of said transverse gummed portions, and folding mechanism.

18. In an envelop machine, the combination with means for supporting and advancing an envelop blank strip, mechanism for forming window openings in said strip at intervals, and mechanism for applying gum to portions of said strip around and between said window openings, of means for applying a continuous transparent strip to the gummed portions of said envelop blank strip, means for cutting out transversely disposed portions of the blank strip without severing the same, a transversely disposed vertically movable gum pad for gumming portions of the blank strip and transparent strip forming the end flaps of the envelop, a transversely movable gumming device for said pad, and folding and severing mechanisms for the envelop blank strip.

19. In an envelop machine, the combination with means for supporting a continuous envelop blank strip, and mechanism for advancing said strip, of mechanism for cutting out transverse portions of the said strip without severing the same to partially blank the strip and define the end flap portions of the envelop blanks, a vertically movable transversely disposed gumming pad for applying gum to the end flap portions of the envelop blank strip and gum applying mechanism for said pad located at one side of the machine and having a transversely reciprocating part for applying gum to the said pad.

20. In an envelop machine, the combination with means for supporting a continuous envelop blank strip, and mechanism for advancing said strip, of mechanism for cutting out transverse portions of the said strip without severing the same, a vertically movable transversely disposed gumming pad for applying gum to the end flap portions of the envelop blank strip, including a gum receptacle located at one side of the machine, a gum feeding roller adjacent thereto, mechanism for supplying said roller with gum from said receptacle, a transversely movable gum applying roller, and means for reciprocating it from said gum feeding roller across the impression face of the gum pad, and folding and severing mechanisms for the envelop blank strip.

21. In an envelop machine, the combination with means for supporting and advancing a continuous envelop blank strip, and mechanism for cutting out transverse portions of said strip without severing the same, of folding mechanism for the semi-detached portion of said strip between said cut-out portions comprising a folding plate engaging the integral portion of the strip adjacent to the line of fold, a folding plunger lying beneath the semi-detached portion of the strip when in folding position, and means for moving said plunger vertically and transversely of the strip to fold said semi-detached portion over upon said folding plate.

22. In an envelop machine, the combination with means for supporting and advancing a continuous envelop blank strip, of means for cutting out transversely disposed portions of said strip and folding mechanism for the semi-detached portions of said strip between said cutout portions comprising a folding plate extending across the integral portion of said strip, and having its edge engaging the strip adjacent to the line of fold, a vertically movable plunger plate located beneath the semi-detached portion of the strip when in folding position, said plate being movable vertically and reciprocatable transversely of said strip, and a creasing device adapted to engage the folded semi-detached portion adjacent to the line of fold.

23. In an envelop machine, the combination with means for supporting and advancing a continuous envelop blank strip, of means for cutting out transverse portions of said strip without severing the strip, means for folding the semi-detached portions of the strip between said cut-out portions, over upon the integral portions of said strip, a creasing device adapted to engage the folded strip adjacent to the line of fold, longitudinally of said strip, and operating devices for bringing said creasing device into engagement with the folded strip and holding it in such engagement during the advancing movement of the envelop blank strip.

24. In an envelop machine, the combination with means for supporting and advancing a continuous envelop blank strip, of mechanism for cutting out transverse portions of said strip without severing said strip, means for folding the semi-detached portions of the said strip between said cut-out portions, a creasing device comprising a part movable toward and from said folded strip, a creasing blade carried thereby, and yielding devices interposed between said movable part and said blade, and mechanism for operating said creasing device.

25. In an envelop machine, the combination with means for supporting and advancing a continuous envelop blank strip, of mechanism for cutting out transverse portions of said strip without severing said strip, means for folding the semi-detached portion of the said strip between said cut-out portions, a creasing device comprising a pivoted part lying normally out of alinement with the line of fold, a vertically yielding creasing blade carried thereby, mechanism for swinging the said creasing device into alinement with and above the line of fold, and means for depressing the creasing device to bring said creasing blade into engagement with the folded portions of the blank.

26. In an envelop machine, the combination with means for supporting and advancing a continuous envelop blank strip, of means for cutting out transverse portions of said strip without severing the strip, a folding blade having a longitudinally disposed edge engaging the integral portions of the strip adjacent to the line of fold, a vertically and horizontally movable folding plunger coöperating with said folding blade to fold the semi-detached portions of the blank between said cut-out portions over upon the integral portions, a yieldingly supported creasing device, and means for moving said creasing device into engagement with the folded blank above the line of fold after the said folding plunger has been operated.

27. In an envelop machine, the combination with means for supporting and advancing a continuous envelop blank strip, means for partially blanking the strip without severing it, and means for gumming transversely disposed portions of said strip forming the end flaps on the individual envelops, said strip advancing mechanism including two pairs of impelling rolls for engaging the strip at different points longitudinally and transversely thereof, one roll of each pair being provided with a cutaway portion on its periphery for bridging over the said transversely gummed portions of the strip, whereby said strip will at all times be gripped by at least one pair of said rolls, mechanism for severing the strip into individual envelop blanks, and means for finally folding said severed blanks.

28. In an envelop machine, the combination with means for supporting and advancing a continuous envelop blank strip, of cutting mechanism for severing said strip, and folding mechanism including devices for clamping the body of the envelop exclusive of the end flaps and sealing flaps, means for moving said clamping devices together with the envelop body vertically, end flap folding devices adjacent to said clamping devices for engaging said end flaps and sealing the same upon a portion of the envelop body, and mechanism for folding and creasing the sealing flap.

29. In an envelop machine, the combination with means for supporting and advancing an envelop blank strip, means for cutting out transverse portions of the strip, gumming devices for gumming transverse portions of the strip in line with said cut-out portions, means for folding the semi-detached portions of the strip between said cut-out portions over upon the integral portions thereof, and means for severing said strip centrally of the transversely gummed portions, of folding mechanism for said partially folded blank including upper and lower clamping members for clamping portions of the blank within the end flap and sealing flap portions thereof, means for moving said clamping devices vertically, and oscillating folding devices for engaging said end flap portions of the blanks and folding them upon the body of the envelop.

30. In an envelop machine, the combination with means for supporting and advancing a continuous envelop blank strip, means for cutting out transverse portions of the strip without severing it, means for applying gum to transverse portions of the strip in line with said cut-out portions, means for folding the semi-detached portions of said strip upon the integral portions thereof, and means for severing said strip centrally of said transverse gummed portions, of folding mechanism including vertically movable clamping members for engaging portions of said severed blank within the end flap and sealing flap portions thereof, one of said clamping members being provided with retractable portions adjacent to the end flap portions of the blank and oscillatable folding devices for engaging the end flap portions of the blank, and folding them upon portions of the envelop normally beneath said retractable portions of said clamping members.

31. In an envelop machine, the combination with means for supporting and advancing a continuous envelop blank strip, means for cutting out transverse portions of the strip without severing it, means for applying gum to transverse portions of the strip in line with said cut-out portions, means for folding the semi-detached portions of said strip upon the integral portions thereof, and means for severing said strip centrally of said transverse gummed portions, of final folding mechanism including upper and lower clamping devices, means for moving said clamping devices vertically, folding devices for the end flap portions of the severed blank located adjacent to said clamping members, and a folding bar having a relative vertical and horizontal movement with respect to said clamping members for folding and creasing the sealing flap.

32. In an envelop machine, the combination with means for supporting and advancing a continuous envelop blank strip, means for cutting out transverse portions of the strip without severing it, means for applying gum to transverse portions of the strip in line with said cut-out portions, means for folding the semi-detached portions of said strip upon the integral portions thereof, and means for severing said strip centrally of said transverse gummed portions, of final folding mechanism comprising upper and lower clamping devices for engaging the severed envelop blank, means for moving said clamping devices vertically, end flap folding devices located adjacent to the vertical travel of said clamping devices, and a sealing flap folding bar carried by one of said clamping devices and movable vertically and horizontally with respect thereto.

33. In an envelop machine, the combination with means for supporting and advancing a continuous envelop blank strip, means for cutting out transverse portions of the strip without severing it, means for applying gum to transverse portions of the strip in line with said cut-out portions, means for folding the semi-detached portions of said strip upon the integral portions thereof, and means for severing said strip centrally of said transverse gummed portions, of final folding mechanism including an upper clamping member, a lower clamping member having a folding lip adjacent to the sealing flap portion of the envelop blank, the upper clamping member being movable with respect to the lower clamping member, means for moving said clamping members simultaneously, vertically, end flap folding devices adjacent to the ends of said clamping members, and a sealing flap folding bar carried by the upper clamping member, movable horizontally and vertically with respect thereto and having a folding lip coöperating with the folding lip on the lower folding member for folding and creasing the sealing flap.

34. In an envelop machine, the combination with means for supporting and advancing a continuous envelop blank strip, means for cutting out transverse portions of the strip without severing it, means for applying gum to transverse portions of the strip in line with said cut out portions, means for folding the semi-detached portions of said strip upon the integral portions thereof, and means for severing said strip centrally of said transverse gummed portions, of a final folding mechanism comprising vertically movable and relatively movable upper and lower clamping members, end flap folding mechanism located adjacent to the path of movement of said clamping members, a folding device for the sealing flap of the envelop, a knockout device for removing the completed envelop from said clamping members, the clamping member adjacent to said knockout mechanism being provided with apertures to receive parts of said knockout mechanism.

35. In an envelop machine, the combination with means for supporting and advancing a continuous envelop blank strip, means for cutting out transverse portions of the strip without severing it, means for applying gum to transverse portions of the strip in line with said cut out portions, means for folding the semi-detached portions of said strip upon the integral portions thereof, and means for severing said strip centrally of said transverse gummed portions, of a final folding mechanism comprising vertically movable and relatively movable upper and lower clamping members for engaging the severed envelop blank, end flap folding devices located adjacent to the path of said clamping members, said lower clamping member being provided with transversely disposed slots, a knockout device below said lower clamping member provided with projections in line with said slots, and means for actuating said knockout mechanism when the clamping mechanism is in its lowest position to remove the envelop from between said clamping members.

36. In an envelop machine, the combination with means for supporting and advancing a continuous envelop blank strip, means for cutting out transverse portions of the strip without severing it, means for applying gum to transverse portions of the strip in line with said cut-out portions, means for folding the semi-detached portions of said strip upon the integral portions thereof, and means for severing said strip centrally of said transverse gummed portions, of a final folding mechanism comprising a lower clamping member, an upper clamping member having retractable end portions, mechanism for moving said clamping members vertically, provided with means for causing relative movement between them, a sealing flap folding bar carried by the upper clamping member and movable vertically and horizontally with respect thereto, a rotary cam mounted adjacent to said upper clamping member and provided with grades for controlling said retractable end portions and said folding bar, end flap sealing devices located adjacent to and below the ends of said clamping members, means for oscillating said sealing devices, and mechanism for operating said cam.

37. In an envelop machine, the combination with means for supporting and advancing a continuous envelop blank strip, means for cutting out transverse portions of the strip without severing it, means for applying gum to transverse portions of the strip in line with said cut-out portions, means for folding the semi-detached portions of said strip upon the integral portions thereof, and means for severing said strip centrally of said transverse gummed portions, of a final folding mechanism comprising clamping members for engaging the severed blank, end flap sealing devices, a folding device for the sealing flap, a knockout device for removing the finished envelop from between the clamping members, and delivery mechanism for receiving the envelop from said knockout mechanism and delivering the same vertically.

38. In an envelop machine, the combination with means for supporting and advancing an envelop blank strip, means for forming window apertures therein at intervals, and means for gumming said strip around and between said apertures, of means for advancing and applying a continuous transparent strip to said gummed portions of the envelop blank strip over said window apertures, means for cutting out transverse portions of the envelop blank strip without severing the said strip, means for perforating the integral portions of the strip adjacent to the window openings, means for gumming transverse portions of the envelop blank strip and transparent strip forming end flap portions, and means for severing the strip to form individual envelop blanks, and folding and sealing the same.

39. In an envelop machine, the combination with means for supporting and advancing an envelop blank strip, cutting mechanism for removing transverse portions of the strip without severing it and for perforating the remaining portions of the strip, means for gumming transverse portions of the strip in line with said transverse cut-out portions, means for folding the semi-detached portions of the strip over upon the integral portions thereof, means for severing the strip, and means for finally folding the end flaps and sealing flaps thereof.

40. In an envelop machine, the combination with means for supporting and advancing an envelop blank, means for advancing and simultaneously applying a transparent strip upon the envelop blank from one end to the other, and devices for perforating the portions of said transparent strip engaging the portions of the envelop blank which form the end flaps of the envelop.

41. In an envelop machine, the combination with means for supporting and advancing an envelop blank strip, means for forming window apertures therein at intervals, and means for applying gum adjacent to and between said window apertures, of means for advancing and applying a continuous transparent strip to the gummed portion of said envelop blank strip over said window apertures, and devices for perforating portions of said transparent strip which engage the portions of the envelop blank strip which form the end flaps of the envelop.

42. In an envelop machine, the combination with means for supporting and advancing an envelop blank strip, means for forming window apertures therein at intervals, and means for applying gum adjacent to and between said window apertures, of means for advancing and applying a continuous transparent strip to the gummed portion of said envelop blank strip over said window apertures, devices for perforating portions of said transparent strip which engage the portions of the envelop blank strip which form the end flaps of the envelop, means for cutting out transverse portions of the envelop blank strip in line with said perforated portions of the transparent strip, means for applying gum to transverse portions of the combined strips in line with said cut-out portions and including the perforated portions of the transparent strip, means for folding the semi-detached portions of the envelop blank strip over upon the integral portions thereof, means for severing said strips simultaneously, centrally of said transversely gummed portions, and folding mechanism for folding the end flap portions of the envelop blank and said perforated portions of the transparent strip over upon the said semi-detached portions of the envelop blank strip, and sealing them thereto.

In testimony whereof I affix my signature, in the presence of two witnesses.

NELSON E. FUNK.

Witnesses:
E. W. WYATT,
BERTHA B. APPEL.